(12) United States Patent
Wong

(10) Patent No.: US 12,396,577 B2
(45) Date of Patent: Aug. 26, 2025

(54) VANITY MIRROR WITH HIDDEN SENSOR

(71) Applicant: simplehuman, LLC, Torrance, CA (US)

(72) Inventor: Ryan Wong, Long Beach, CA (US)

(73) Assignee: simplehuman, LLC, Torrance, CA (US)

(*) Notice: Subject to any disclaimer, the term of this patent is extended or adjusted under 35 U.S.C. 154(b) by 0 days.

(21) Appl. No.: 18/591,450

(22) Filed: Feb. 29, 2024

(65) Prior Publication Data

US 2024/0292966 A1 Sep. 5, 2024

Related U.S. Application Data

(60) Provisional application No. 63/488,389, filed on Mar. 3, 2023.

(51) Int. Cl.
| | | |
|---|---|---|
| *A47G 1/02* | (2006.01) | |
| *F21V 23/02* | (2006.01) | |
| *F21V 23/04* | (2006.01) | |
| *G01S 17/04* | (2020.01) | |

(Continued)

(52) U.S. Cl.
CPC .............. *A47G 1/02* (2013.01); *F21V 23/023* (2013.01); *F21V 23/0471* (2013.01); *G01S 17/04* (2020.01); *G02B 5/10* (2013.01); *A47G 2200/085* (2013.01); *F21Y 2115/10* (2016.08)

(58) Field of Classification Search
CPC .... A47G 1/02; A47G 2200/085; G01S 17/04; F21V 23/023; F21V 23/0471; G02B 5/10; F21Y 2115/10
See application file for complete search history.

(56) References Cited

U.S. PATENT DOCUMENTS

| | | |
|---|---|---|
| D44,537 S | 8/1913 | McIsaac |
| D51,556 S | 12/1917 | Hawthorne |
| 1,338,582 A | 4/1920 | Morris et al. |

(Continued)

FOREIGN PATENT DOCUMENTS

| | | |
|---|---|---|
| CN | 3044427 | 5/1996 |
| CN | 1190201 A | 8/1998 |

(Continued)

OTHER PUBLICATIONS

U.S. Appl. No. 29/631,301, filed Dec. 28, 2017, Yang et al.

(Continued)

*Primary Examiner* — Bao Q Truong
(74) *Attorney, Agent, or Firm* — Knobbe, Martens, Olson & Bear, LLP

(57) ABSTRACT

The present disclosure relates to a mirror assembly having a housing, a first mirror, a second mirror, a light source, and a sensor assembly. The first mirror can be positioned within an opening of the housing. The front surface of the second mirror can be coupled to a rear surface of the first mirror. The light source can be disposed on or at least partially around the first mirror. The sensor assembly can be positioned between a rear surface of the second mirror and the housing. The sensor assembly can include a transmitter positioned behind the rear surface of the second mirror and a receiver positioned behind the rear surface of the second mirror. The light source can be activated when the sensor assembly detects a user's presence.

23 Claims, 12 Drawing Sheets

(51) Int. Cl.
*G02B 5/10* (2006.01)
*F21Y 115/10* (2016.01)

(56) References Cited

U.S. PATENT DOCUMENTS

| | | |
|---|---|---|
| 1,451,236 A | 4/1923 | Stanfiled |
| D65,759 S | 10/1924 | Short |
| 1,541,451 A | 6/1925 | Wallace |
| 2,004,166 A | 6/1935 | Low |
| 2,201,251 A | 5/1940 | Patten |
| 2,235,281 A | 3/1941 | Carver |
| 2,292,059 A | 8/1942 | Charles |
| D163,481 S | 5/1951 | Rauh |
| 2,687,674 A | 8/1954 | Emilea |
| 2,737,852 A | 3/1956 | Porter et al. |
| 3,006,252 A | 10/1961 | Kacowski |
| 3,045,551 A | 7/1962 | Bonanno |
| 3,315,932 A | 4/1967 | Chandler |
| D208,234 S | 8/1967 | Ely |
| D209,077 S | 10/1967 | Andre |
| D213,392 S | 2/1969 | Andre |
| D216,414 S | 12/1969 | Hanson |
| 3,575,496 A | 4/1971 | Pollock et al. |
| 3,623,356 A | 11/1971 | Bisberg |
| 3,711,179 A | 1/1973 | Takeda |
| 3,732,702 A | 5/1973 | Desch |
| 3,751,140 A | 8/1973 | Berlin et al. |
| 3,751,141 A | 8/1973 | Brown |
| 3,794,828 A | 2/1974 | Arpino |
| 3,825,324 A | 7/1974 | Brewington |
| 3,914,029 A | 10/1975 | Hoplock |
| 3,949,767 A | 4/1976 | Rose |
| D243,301 S | 2/1977 | Ravn |
| D243,478 S | 2/1977 | Jones |
| 4,129,355 A | 12/1978 | Noguchi |
| D254,208 S | 2/1980 | Breslow |
| 4,278,870 A | 7/1981 | Carleton et al. |
| D261,845 S | 11/1981 | Wachtel |
| D266,028 S | 8/1982 | Boyd |
| 4,491,899 A | 1/1985 | Fleming |
| D284,483 S | 7/1986 | Yang |
| D290,662 S | 7/1987 | Basil et al. |
| D307,358 S | 4/1990 | Gerton |
| D309,833 S | 8/1990 | Wahl |
| D317,531 S | 6/1991 | Evans |
| 5,025,354 A | 6/1991 | Kondo |
| 5,093,748 A | 3/1992 | Higdon |
| 5,164,861 A | 11/1992 | Katz |
| D335,580 S | 5/1993 | Gaullier |
| 5,217,296 A | 6/1993 | Tanner et al. |
| 5,267,081 A | 11/1993 | Pein |
| 5,267,786 A | 12/1993 | Aisley |
| 5,392,162 A | 2/1995 | Glucksman |
| D378,159 S | 2/1997 | Mulkey |
| D379,125 S | 5/1997 | Simjian |
| D391,773 S | 3/1998 | Zaidman et al. |
| 5,796,176 A | 8/1998 | Kramer et al. |
| D409,003 S | 5/1999 | Scavini |
| 5,979,976 A | 11/1999 | Ferencik |
| 5,984,485 A | 11/1999 | Poli et al. |
| 6,042,242 A | 3/2000 | Chang |
| D425,313 S | 5/2000 | Zadro |
| D426,182 S | 6/2000 | Brown |
| 6,106,121 A | 8/2000 | Buckley et al. |
| D431,375 S | 10/2000 | Zadro |
| 6,158,877 A | 12/2000 | Zadro |
| 6,206,530 B1 | 3/2001 | Eberts |
| D442,371 S | 5/2001 | Eberts |
| 6,231,992 B1 | 5/2001 | Niebauer et al. |
| 6,241,357 B1 | 6/2001 | Lee |
| 6,270,240 B1 | 8/2001 | Inoue |
| 6,273,585 B1 | 8/2001 | Wu |
| 6,305,809 B1 | 10/2001 | Zadro |
| D454,701 S | 3/2002 | Eric |
| D459,094 S | 6/2002 | Stone et al. |
| 6,420,682 B1 | 7/2002 | Sellgren et al. |
| 6,466,826 B1 | 10/2002 | Nishihira et al. |
| D465,490 S | 11/2002 | Wei |
| 6,496,107 B1 | 12/2002 | Himmelstein |
| 6,553,123 B1 | 4/2003 | Dykstra |
| D474,432 S | 5/2003 | Good |
| 6,560,027 B2 | 5/2003 | Meine |
| 6,594,630 B1 | 7/2003 | Zlokarnik et al. |
| 6,604,836 B2 | 8/2003 | Carlucci et al. |
| 6,676,272 B2 | 1/2004 | Chance |
| D486,964 S | 2/2004 | Prince et al. |
| D488,626 S | 4/2004 | Kruger |
| D492,230 S | 6/2004 | Berger |
| 6,830,154 B2 | 12/2004 | Zadro |
| 6,848,822 B2 | 2/2005 | Ballen et al. |
| 6,854,852 B1 | 2/2005 | Zadro |
| D505,555 S | 5/2005 | Snell |
| 6,886,351 B2 | 5/2005 | Palfy et al. |
| D508,883 S | 8/2005 | Falconer |
| D509,369 S | 9/2005 | Snell |
| D511,413 S | 11/2005 | Yue |
| 6,961,168 B2 | 11/2005 | Agrawal et al. |
| D512,841 S | 12/2005 | Dirks |
| 7,004,599 B2 | 2/2006 | Mullani |
| 7,048,406 B1 * | 5/2006 | Shih ............ A45D 42/10 362/135 |
| 7,054,668 B2 | 5/2006 | Endo et al. |
| D524,469 S | 7/2006 | Pitot et al. |
| 7,090,378 B1 | 8/2006 | Zadro |
| D532,981 S | 12/2006 | Zadro |
| D540,549 S | 4/2007 | Yue |
| 7,233,154 B2 | 6/2007 | Groover et al. |
| D546,567 S | 7/2007 | Bhavnani |
| D547,555 S | 7/2007 | Lo et al. |
| D558,987 S | 1/2008 | Gildersleeve |
| D562,571 S | 2/2008 | Pitot |
| 7,341,356 B1 | 3/2008 | Zadro |
| 7,347,573 B1 | 3/2008 | Isler |
| 7,349,144 B2 | 3/2008 | Varaprasad et al. |
| D568,081 S | 5/2008 | Thompson et al. |
| D569,671 S | 5/2008 | Thompson et al. |
| 7,370,982 B2 | 5/2008 | Bauer et al. |
| D572,024 S | 7/2008 | Shapiro |
| 7,393,115 B2 | 7/2008 | Tokushita et al. |
| D574,159 S | 8/2008 | Howard |
| 7,417,699 B2 | 8/2008 | Yun et al. |
| 7,423,522 B2 | 9/2008 | O'brien et al. |
| 7,435,928 B2 | 10/2008 | Platz |
| 7,446,924 B2 | 11/2008 | Schofield et al. |
| 7,455,412 B2 | 11/2008 | Rottcher |
| D582,984 S | 12/2008 | Mininger et al. |
| D584,516 S | 1/2009 | Otomo |
| 7,500,755 B2 | 3/2009 | Ishizaki et al. |
| 7,513,476 B1 | 4/2009 | Huang |
| 7,551,354 B2 | 6/2009 | Horsten et al. |
| 7,570,413 B2 | 8/2009 | Tonar et al. |
| 7,589,893 B2 | 9/2009 | Rottcher |
| 7,621,651 B2 | 11/2009 | Chan et al. |
| 7,626,655 B2 | 12/2009 | Yamazaki et al. |
| 7,636,195 B2 | 12/2009 | Nieuwkerk et al. |
| 7,651,229 B1 | 1/2010 | Rimback et al. |
| 7,679,809 B2 | 3/2010 | Tonar et al. |
| 7,728,927 B2 | 6/2010 | Nieuwkerk et al. |
| 7,805,260 B2 * | 9/2010 | Mischel, Jr. ............ G09F 9/00 362/135 |
| D625,930 S | 10/2010 | Merica |
| 7,813,023 B2 | 10/2010 | Baur |
| 7,813,060 B1 | 10/2010 | Bright et al. |
| 7,826,123 B2 | 11/2010 | McCabe et al. |
| 7,853,414 B2 | 12/2010 | Mischel, Jr. et al. |
| 7,855,755 B2 | 12/2010 | Weller et al. |
| 7,856,248 B2 | 12/2010 | Fujisaki |
| 7,859,737 B2 | 12/2010 | McCabe et al. |
| 7,859,738 B2 | 12/2010 | Baur et al. |
| 7,864,399 B2 | 1/2011 | McCabe et al. |
| D635,009 S | 3/2011 | Paterson |
| 7,898,719 B2 | 3/2011 | Schofield et al. |
| 7,903,335 B2 | 3/2011 | Nieuwkerk et al. |
| 7,916,129 B2 | 3/2011 | Lin et al. |

(56) References Cited

U.S. PATENT DOCUMENTS

| | | |
|---|---|---|
| 7,916,380 B2 | 3/2011 | Tonar et al. |
| 7,953,648 B2 | 5/2011 | Vock |
| D639,077 S | 6/2011 | DeBretton Gordon |
| 7,978,393 B2 | 7/2011 | Tonar et al. |
| 8,004,741 B2 | 8/2011 | Tonar et al. |
| D647,444 S | 10/2011 | Manukyan et al. |
| D649,790 S | 12/2011 | Pitot |
| 8,083,386 B2 | 12/2011 | Lynam |
| D652,220 S | 1/2012 | Pitot |
| 8,099,247 B2 | 1/2012 | Mischel, Jr. et al. |
| D656,979 S | 4/2012 | Yip et al. |
| D657,425 S | 4/2012 | Podd |
| D657,576 S | 4/2012 | Pitot |
| 8,154,418 B2 | 4/2012 | Peterson et al. |
| 8,162,502 B1 | 4/2012 | Zadro |
| D658,604 S | 5/2012 | Egawa et al. |
| D660,367 S | 5/2012 | Podd |
| D660,368 S | 5/2012 | Podd |
| D660,369 S | 5/2012 | Podd |
| 8,179,236 B2 | 5/2012 | Weller et al. |
| 8,179,586 B2 | 5/2012 | Schofield et al. |
| 8,194,133 B2 | 6/2012 | DeWind et al. |
| 8,228,588 B2 | 7/2012 | McCabe et al. |
| D665,030 S | 8/2012 | Podd |
| D666,010 S | 8/2012 | Farley |
| D670,087 S | 11/2012 | Walker |
| 8,335,032 B2 | 12/2012 | McCabe et al. |
| 8,348,441 B1 | 1/2013 | Skelton |
| 8,356,908 B1 | 1/2013 | Zadro |
| 8,379,289 B2 | 2/2013 | Schofield et al. |
| 8,382,189 B2 | 2/2013 | Li et al. |
| 8,393,749 B1 | 3/2013 | Daicos |
| 8,400,704 B2 | 3/2013 | McCabe et al. |
| D679,101 S | 4/2013 | Pitot |
| D679,102 S | 4/2013 | Gilboe et al. |
| D680,755 S | 4/2013 | Gilboe et al. |
| 8,503,062 B2 | 8/2013 | Baur et al. |
| 8,506,096 B2 | 8/2013 | McCabe et al. |
| 8,508,832 B2 | 8/2013 | Baumann et al. |
| 8,511,841 B2 | 8/2013 | Varaprasad et al. |
| D688,883 S | 9/2013 | Gilboe et al. |
| D689,701 S | 9/2013 | Mischel, Jr. et al. |
| 8,559,092 B2 | 10/2013 | Bugno et al. |
| 8,559,093 B2 | 10/2013 | Varaprasad et al. |
| 8,585,273 B2 | 11/2013 | Pokrovskiy et al. |
| D699,448 S | 2/2014 | Yang et al. |
| D699,952 S | 2/2014 | Yang et al. |
| 8,649,082 B2 | 2/2014 | Baur |
| D701,050 S | 3/2014 | Yang et al. |
| D701,507 S | 3/2014 | Cope |
| 8,705,161 B2 | 4/2014 | Schofield et al. |
| 8,727,547 B2 | 5/2014 | McCabe et al. |
| D707,454 S | 6/2014 | Pitot |
| 8,743,051 B1 | 6/2014 | Moy et al. |
| D711,871 S | 8/2014 | Daniel |
| D711,874 S | 8/2014 | Cope |
| 8,797,627 B2 | 8/2014 | McCabe et al. |
| D712,963 S | 9/2014 | Fleet |
| 8,880,360 B2 | 11/2014 | Mischel, Jr. et al. |
| 8,910,402 B2 | 12/2014 | Mischel, Jr. et al. |
| D727,630 S | 4/2015 | Zadro |
| D729,525 S | 5/2015 | Tsai |
| D729,527 S | 5/2015 | Tsai |
| D730,065 S | 5/2015 | Tsai |
| 9,068,737 B2 | 6/2015 | Kirchberger et al. |
| 9,090,211 B2 | 7/2015 | McCabe et al. |
| D736,001 S | 8/2015 | Yang et al. |
| D737,059 S | 8/2015 | Tsai |
| D737,060 S | 8/2015 | Yang et al. |
| 9,105,202 B2 | 8/2015 | Mischel, Jr. et al. |
| D737,580 S | 9/2015 | Tsai |
| D738,118 S | 9/2015 | Gyanendra et al. |
| 9,170,353 B2 | 10/2015 | Chang |
| 9,173,509 B2 | 11/2015 | Mischel, Jr. et al. |
| 9,174,578 B2 | 11/2015 | Uken et al. |
| 9,205,780 B2 | 12/2015 | Habibi et al. |
| 9,232,846 B2 | 1/2016 | Fung |
| 9,254,789 B2 | 2/2016 | Anderson et al. |
| D751,829 S | 3/2016 | Yang et al. |
| D754,446 S | 4/2016 | Yang et al. |
| 9,327,649 B2 | 5/2016 | Habibi |
| 9,341,914 B2 | 5/2016 | McCabe et al. |
| 9,347,660 B1 | 5/2016 | Zadro |
| D764,592 S | 8/2016 | Zenoff |
| 9,499,103 B2 | 11/2016 | Han |
| 9,510,711 B2 | 12/2016 | Tsibulevskiy et al. |
| 9,528,695 B2 | 12/2016 | Adachi et al. |
| D776,945 S | 1/2017 | Yang |
| D779,836 S | 2/2017 | Bailey |
| D785,345 S | 5/2017 | Yang et al. |
| 9,638,410 B2 | 5/2017 | Yang et al. |
| 9,694,751 B2 | 7/2017 | Lundy, Jr. et al. |
| 9,709,869 B2 | 7/2017 | Baumann et al. |
| D793,099 S | 8/2017 | Bailey |
| 9,765,958 B2 | 9/2017 | Lumaye et al. |
| D801,060 S | 10/2017 | Hollinger |
| 9,827,912 B2 | 11/2017 | Olesen et al. |
| 9,845,537 B2 | 12/2017 | Mischel, Jr. et al. |
| 9,878,670 B2 | 1/2018 | McCabe et al. |
| 9,897,306 B2 | 2/2018 | Yang et al. |
| 9,921,390 B1 | 3/2018 | Mischel, Jr. et al. |
| 9,933,595 B1 | 4/2018 | Mischel, Jr. et al. |
| D816,350 S | 5/2018 | Yang et al. |
| 10,016,045 B1 | 7/2018 | Hollinger |
| 10,023,123 B2 | 7/2018 | Takada et al. |
| 10,029,616 B2 | 7/2018 | McCabe et al. |
| 10,035,461 B2 | 7/2018 | Lin et al. |
| D825,940 S | 8/2018 | Liu |
| 10,076,176 B2 | 9/2018 | Yang et al. |
| D830,706 S | 10/2018 | Pitot |
| 10,161,622 B1 | 12/2018 | Frazier |
| D840,699 S | 2/2019 | Xie |
| D845,652 S | 4/2019 | Yang et al. |
| D846,288 S | 4/2019 | Yang et al. |
| D848,158 S | 5/2019 | Yang et al. |
| D850,125 S | 6/2019 | Wang et al. |
| D854,838 S | 7/2019 | Jeon et al. |
| D869,863 S | 12/2019 | Liu |
| D871,084 S | 12/2019 | Pestl et al. |
| 10,524,591 B2 | 1/2020 | Kim |
| D874,161 S | 2/2020 | Yang et al. |
| D874,162 S | 2/2020 | Greenwalt |
| D878,776 S | 3/2020 | Liu |
| D879,481 S | 3/2020 | Yang |
| D879,482 S | 3/2020 | Yang |
| D882,280 S | 4/2020 | Yang |
| 10,652,447 B1 | 5/2020 | Pestl et al. |
| D885,769 S | 6/2020 | Wang |
| D891,121 S | 7/2020 | Zhao et al. |
| D891,123 S | 7/2020 | Li et al. |
| D891,125 S | 7/2020 | Liu |
| 10,702,043 B2 | 7/2020 | Yang et al. |
| D891,792 S | 8/2020 | Yang |
| D892,508 S | 8/2020 | Yang |
| D893,892 S | 8/2020 | Rajasekaran et al. |
| 10,746,394 B2 | 8/2020 | Yang et al. |
| D894,615 S | 9/2020 | Yang |
| D895,305 S | 9/2020 | Yang |
| D897,694 S | 10/2020 | Lin |
| D897,695 S | 10/2020 | Yang |
| D898,383 S | 10/2020 | Zhou |
| D898,386 S | 10/2020 | Huang |
| D898,387 S | 10/2020 | Yang |
| D901,908 S | 11/2020 | Zhao et al. |
| 10,869,537 B2 | 12/2020 | Yang et al. |
| D909,770 S | 2/2021 | Li et al. |
| D918,602 S | 5/2021 | Chen |
| D919,981 S | 5/2021 | Li |
| D919,983 S | 5/2021 | Yang |
| D919,984 S | 5/2021 | Yang |
| 11,013,307 B2 | 5/2021 | Yang et al. |
| 11,026,497 B2 | 6/2021 | Yang et al. |
| D924,456 S | 7/2021 | Zhao et al. |
| D925,928 S | 7/2021 | Yang et al. |

(56) References Cited

U.S. PATENT DOCUMENTS

| | | |
|---|---|---|
| D927,863 S | 8/2021 | Yang et al. |
| D932,198 S | 10/2021 | Sze |
| D932,781 S | 10/2021 | Liu |
| D933,374 S | 10/2021 | Luo |
| D935,791 S | 11/2021 | Li et al. |
| D938,170 S | 12/2021 | Liu |
| D939,842 S | 1/2022 | Li et al. |
| D939,843 S | 1/2022 | Li et al. |
| D942,159 S | 2/2022 | Yang |
| D949,579 S | 4/2022 | Chen |
| 11,371,692 B2 | 6/2022 | Yang et al. |
| 11,549,680 B2 * | 1/2023 | Feit .................. F21V 23/005 |
| 11,566,784 B2 | 1/2023 | Yang et al. |
| 11,622,614 B2 | 4/2023 | Yang et al. |
| 11,640,042 B2 * | 5/2023 | Yang .................. F21V 3/02 |
| | | 362/135 |
| D990,174 S | 6/2023 | Yang et al. |
| 11,708,031 B2 | 7/2023 | Yang et al. |
| D1,009,485 S | 1/2024 | Yang et al. |
| 2002/0196333 A1 | 12/2002 | Gorischek |
| 2003/0030063 A1 | 2/2003 | Sosniak et al. |
| 2003/0031010 A1 | 2/2003 | Sosniak et al. |
| 2003/0065515 A1 | 4/2003 | Yokota |
| 2003/0133292 A1 | 7/2003 | Mueller et al. |
| 2003/0223250 A1 | 12/2003 | Ballen et al. |
| 2004/0020509 A1 | 2/2004 | Waisman |
| 2004/0027695 A1 | 2/2004 | Lin |
| 2004/0125592 A1 | 7/2004 | Nagakubo et al. |
| 2004/0156133 A1 | 8/2004 | Vernon |
| 2004/0173498 A1 | 9/2004 | Lee |
| 2005/0036300 A1 | 2/2005 | Dowling et al. |
| 2005/0068646 A1 | 3/2005 | Lev et al. |
| 2005/0146863 A1 | 7/2005 | Mullani |
| 2005/0156753 A1 | 7/2005 | Deline et al. |
| 2005/0243556 A1 | 11/2005 | Lynch |
| 2005/0270769 A1 | 12/2005 | Smith |
| 2005/0276053 A1 | 12/2005 | Nortrup et al. |
| 2006/0006988 A1 | 1/2006 | Harter, Jr. et al. |
| 2006/0077654 A1 | 4/2006 | Krieger et al. |
| 2006/0132923 A1 | 6/2006 | Hsiao et al. |
| 2006/0164725 A1 | 7/2006 | Horsten et al. |
| 2006/0184993 A1 | 8/2006 | Goldthwaite et al. |
| 2006/0186314 A1 | 8/2006 | Leung |
| 2006/0286396 A1 | 12/2006 | Jonza |
| 2007/0040033 A1 | 2/2007 | Rosenberg |
| 2007/0050211 A1 | 3/2007 | Mandl |
| 2007/0097672 A1 | 5/2007 | Benn |
| 2007/0146616 A1 | 6/2007 | Nouchi et al. |
| 2007/0159846 A1 | 7/2007 | Nishiyama et al. |
| 2007/0183037 A1 | 8/2007 | De Boer et al. |
| 2007/0263999 A1 | 11/2007 | Keam |
| 2007/0297189 A1 | 12/2007 | Wu et al. |
| 2008/0024864 A1 | 1/2008 | Alberti |
| 2008/0078796 A1 | 4/2008 | Parsons |
| 2008/0088244 A1 | 4/2008 | Morishita |
| 2008/0118080 A1 | 5/2008 | Gratke et al. |
| 2008/0130305 A1 | 6/2008 | Wang et al. |
| 2008/0244940 A1 | 10/2008 | Mesika |
| 2008/0258110 A1 | 10/2008 | Oshio |
| 2008/0265799 A1 | 10/2008 | Sibert |
| 2008/0271354 A1 | 11/2008 | Bostrom |
| 2008/0294012 A1 | 11/2008 | Kurtz et al. |
| 2008/0297586 A1 | 12/2008 | Kurtz et al. |
| 2008/0298080 A1 | 12/2008 | Wu et al. |
| 2009/0027902 A1 | 1/2009 | Fielding et al. |
| 2009/0097252 A1 | 4/2009 | Liou et al. |
| 2009/0194670 A1 | 8/2009 | Rains, Jr. et al. |
| 2009/0207339 A1 | 8/2009 | Ajichi et al. |
| 2009/0213604 A1 | 8/2009 | Uken |
| 2009/0244740 A1 | 10/2009 | Takayanagi et al. |
| 2009/0301927 A1 | 12/2009 | Fvlbrook et al. |
| 2010/0033988 A1 | 2/2010 | Chiu et al. |
| 2010/0118422 A1 | 5/2010 | Holacka |
| 2010/0118520 A1 | 5/2010 | Stern et al. |
| 2010/0214662 A1 | 8/2010 | Takayanagi et al. |
| 2010/0296298 A1 | 11/2010 | Martin, Jr. |
| 2010/0309159 A1 | 12/2010 | Roettcher |
| 2011/0058269 A1 | 3/2011 | Su |
| 2011/0074225 A1 | 3/2011 | Delnoij et al. |
| 2011/0080374 A1 | 4/2011 | Feng et al. |
| 2011/0168687 A1 | 7/2011 | Door et al. |
| 2011/0194200 A1 | 8/2011 | Greenlee |
| 2011/0211079 A1 | 9/2011 | Rolston |
| 2011/0273659 A1 | 11/2011 | Sobecki |
| 2011/0283577 A1 | 11/2011 | Cornelissen et al. |
| 2012/0056738 A1 | 3/2012 | Lynam |
| 2012/0080903 A1 | 4/2012 | Li et al. |
| 2012/0081915 A1 | 4/2012 | Foote et al. |
| 2012/0229789 A1 | 9/2012 | Kang et al. |
| 2012/0307490 A1 | 12/2012 | Ellis |
| 2013/0026512 A1 | 1/2013 | Tsai |
| 2013/0077292 A1 | 3/2013 | Zimmerman |
| 2013/0120989 A1 | 5/2013 | Sun et al. |
| 2013/0190845 A1 | 7/2013 | Liu et al. |
| 2013/0235607 A1 | 9/2013 | Yang et al. |
| 2013/0235610 A1 | 9/2013 | Yang et al. |
| 2014/0240964 A1 | 8/2014 | Adachi et al. |
| 2014/0265768 A1 | 9/2014 | Diemel, Jr. et al. |
| 2015/0060431 A1 | 3/2015 | Yang et al. |
| 2015/0203970 A1 | 7/2015 | Mischel, Jr. et al. |
| 2015/0205110 A1 | 7/2015 | Mischel, Jr. et al. |
| 2015/0305113 A1 | 10/2015 | Ellis |
| 2016/0045015 A1 | 2/2016 | Baldwin |
| 2016/0070085 A1 | 3/2016 | Mischel, Jr. et al. |
| 2016/0082890 A1 | 3/2016 | Habibi et al. |
| 2016/0178964 A1 | 6/2016 | Sakai et al. |
| 2016/0193902 A1 | 7/2016 | Hill et al. |
| 2016/0200256 A1 | 7/2016 | Takada et al. |
| 2016/0243989 A1 | 8/2016 | Habibi |
| 2016/0255941 A1 | 9/2016 | Yang et al. |
| 2017/0028924 A1 | 2/2017 | Baur et al. |
| 2017/0139302 A1 | 5/2017 | Tonar |
| 2017/0158139 A1 | 6/2017 | Tonar et al. |
| 2017/0164719 A1 | 6/2017 | Wheeler |
| 2017/0181541 A1 | 6/2017 | Stanley, Jr. et al. |
| 2017/0188020 A1 | 6/2017 | Sakai et al. |
| 2017/0190290 A1 | 7/2017 | Lin et al. |
| 2017/0257543 A1 | 9/2017 | Rowles et al. |
| 2017/0285392 A1 | 10/2017 | Hirata et al. |
| 2017/0297495 A1 | 10/2017 | Lundy, Jr. et al. |
| 2017/0297498 A1 | 10/2017 | Larson et al. |
| 2017/0313251 A1 | 11/2017 | Uken et al. |
| 2017/0322389 A1 | 11/2017 | Hagestad et al. |
| 2017/0349102 A1 | 12/2017 | Habibi |
| 2018/0012526 A1 | 1/2018 | Dunn et al. |
| 2018/0015880 A1 | 1/2018 | Olesen et al. |
| 2018/0017823 A1 | 1/2018 | Saenger Nayver et al. |
| 2018/0032227 A1 | 2/2018 | Broxson |
| 2018/0050641 A1 | 2/2018 | Lin et al. |
| 2018/0105114 A1 | 4/2018 | Geerlings et al. |
| 2018/0147993 A1 | 5/2018 | McCabe et al. |
| 2018/0162269 A1 | 6/2018 | Bredeweg et al. |
| 2018/0172265 A1 | 6/2018 | Yang et al. |
| 2018/0251069 A1 | 9/2018 | LaCross et al. |
| 2018/0263362 A1 | 9/2018 | Yang et al. |
| 2018/0268747 A1 | 9/2018 | Braun |
| 2018/0270410 A1 | 9/2018 | Lyle et al. |
| 2018/0343418 A1 | 11/2018 | Van Ness |
| 2019/0000219 A1 | 1/2019 | Yang et al. |
| 2019/0003699 A1 | 1/2019 | Mondora |
| 2019/0054863 A1 | 2/2019 | Roth |
| 2019/0086890 A1 | 3/2019 | Bradley et al. |
| 2019/0087788 A1 | 3/2019 | Murphy et al. |
| 2019/0089550 A1 | 3/2019 | Rexach et al. |
| 2019/0138704 A1 | 5/2019 | Shrivastava et al. |
| 2019/0172464 A1 | 6/2019 | Bargetzi et al. |
| 2019/0246772 A1 | 8/2019 | Yang et al. |
| 2019/0250781 A1 | 8/2019 | Savitski |
| 2019/0267825 A1 | 8/2019 | Chien |
| 2019/0291647 A1 | 9/2019 | Yang et al. |
| 2019/0328161 A1 | 10/2019 | Wei |
| 2019/0351830 A1 | 11/2019 | Bosma et al. |
| 2020/0008592 A1 | 1/2020 | Meyers et al. |
| 2020/0085170 A1 | 3/2020 | Yang et al. |

(56) References Cited

U.S. PATENT DOCUMENTS

| | | |
|---|---|---|
| 2020/0268127 A1 | 8/2020 | Yang et al. |
| 2020/0278514 A1 | 9/2020 | Yang et al. |
| 2020/0333934 A1 | 10/2020 | Pestl et al. |
| 2021/0025584 A1 | 1/2021 | Yang et al. |
| 2021/0137266 A1 | 5/2021 | Pestl et al. |
| 2021/0196028 A1 | 7/2021 | Yang et al. |
| 2021/0307491 A1 | 10/2021 | Yang et al. |
| 2021/0364892 A1 | 11/2021 | Copeland et al. |
| 2022/0282861 A1 | 9/2022 | Yang et al. |
| 2023/0102011 A1 | 3/2023 | Yang et al. |
| 2023/0204201 A1 | 6/2023 | Yang et al. |

FOREIGN PATENT DOCUMENTS

| | | |
|---|---|---|
| CN | 2379638 Y | 5/2000 |
| CN | 3357935 | 3/2004 |
| CN | 2852806 Y | 1/2007 |
| CN | 2925206 Y | 7/2007 |
| CN | 300746709 | 2/2008 |
| CN | 101160003 A | 4/2008 |
| CN | 101382025 A | 3/2009 |
| CN | 300973066 S | 8/2009 |
| CN | 300983799 S | 8/2009 |
| CN | 300990023 S | 8/2009 |
| CN | 301001894 S | 9/2009 |
| CN | 201335322 Y | 10/2009 |
| CN | 201388790 Y | 1/2010 |
| CN | 301108997 S | 1/2010 |
| CN | 301209880 S | 5/2010 |
| CN | 101787830 A | 7/2010 |
| CN | 301278203 S | 7/2010 |
| CN | 301340032 S | 9/2010 |
| CN | 301502988 S | 4/2011 |
| CN | 102057756 A | 5/2011 |
| CN | 102109129 A | 6/2011 |
| CN | 301583101 S | 6/2011 |
| CN | 301811715 S | 1/2012 |
| CN | 302103915 S | 10/2012 |
| CN | 302140631 S | 10/2012 |
| CN | 302140632 S | 10/2012 |
| CN | 302337970 S | 3/2013 |
| CN | 302363850 S | 3/2013 |
| CN | 302396166 S | 4/2013 |
| CN | 302442518 S | 5/2013 |
| CN | 103300590 A | 9/2013 |
| CN | 302638575 S | 11/2013 |
| CN | 302668773 S | 12/2013 |
| CN | 204146556 U | 2/2015 |
| CN | 205265762 U | 5/2016 |
| CN | 205072328 U | 9/2016 |
| CN | 106377049 A | 2/2017 |
| CN | 206119539 | 4/2017 |
| CN | 106723885 A | 5/2017 |
| CN | 206371658 | 8/2017 |
| CN | 108185741 | 6/2018 |
| CN | 108308888 | 7/2018 |
| CN | 207626762 U | 7/2018 |
| CN | 108713949 | 10/2018 |
| CN | 211577476 U | 9/2020 |
| CN | 211600392 U | 9/2020 |
| CN | 111759073 A | 10/2020 |
| CN | 306124222 | 10/2020 |
| CN | 308268382 S | 10/2023 |
| CN | 308330983 S | 11/2023 |
| CN | 308338019 S | 11/2023 |
| DE | 2924529 A1 | 1/1981 |
| DE | 29904039 U1 | 6/1999 |
| DE | 20014279 U1 | 2/2001 |
| DE | 102004042929 A1 | 3/2006 |
| DE | 202007013393 U1 | 12/2007 |
| DE | 102006060781 A1 | 4/2008 |
| DE | 202009004795 U1 | 9/2009 |
| DE | 202010000170 U1 | 7/2010 |
| DE | 202012103555 U1 | 2/2014 |
| EP | 0367134 | 5/1990 |
| EP | 1792553 A2 | 6/2007 |
| FR | 2 788 951 | 8/2000 |
| GB | 2346206 A | 8/2000 |
| GB | 2363712 | 1/2002 |
| JP | S49-131097 | 11/1974 |
| JP | 55-129073 | 10/1980 |
| JP | 59-166769 | 11/1984 |
| JP | S62-112931 | 7/1987 |
| JP | H05-009413 | 2/1993 |
| JP | 3057292 | 12/1998 |
| JP | 2003-79495 | 3/2003 |
| JP | 2004-290531 A | 10/2004 |
| JP | 2006-202602 | 8/2006 |
| JP | 2008-073174 A | 4/2008 |
| JP | 2013-172802 | 9/2013 |
| JP | 2014-212075 | 11/2014 |
| JP | 2016-168171 A | 9/2016 |
| JP | 2017-144039 | 8/2017 |
| JP | 2018-167022 A | 11/2018 |
| JP | 7497367 | 6/2024 |
| KR | 30-0318286 | 2/2003 |
| KR | 2003-0017261 A | 3/2003 |
| KR | 30-0330692 | 8/2003 |
| KR | 200400903 Y1 | 11/2005 |
| KR | 30-0507873 | 10/2008 |
| KR | 30-0586341 | 1/2011 |
| KR | 30-0692452 | 5/2013 |
| KR | 30-0712086 | 10/2013 |
| WO | WO 2004/074886 A1 | 9/2004 |
| WO | WO 2013/047784 A1 | 4/2013 |
| WO | WO 2018/045649 A1 | 3/2018 |
| WO | WO 2020/061091 A1 | 3/2020 |

OTHER PUBLICATIONS

U.S. Appl. No. 29/662,730, filed Sep. 7, 2018, Yang et al.
U.S. Appl. No. 29/689,860, filed May 2, 2019, Yang et al.
Ilumay M-97 Led Smart Sensor Mirror, available from internet https://www.alibaba.com/product-detail/ilumay-M-97-led-smart-sensor_60701769220.html, availablility as early as Dec. 16, 2017.
Advanced Lighting Guidelines, 1993 (second edition), Chapter entitled, "Occupant Sensors", Published by California Energy Commission (CEC Pub.), in 14 pages.
Jerdon, Model JRT910CL 5X Magnified Lighted Tabletop Rectangular Mirror, Chrome Finish, 67.2 Ounce, https://www.amazon.com/Jerdon-JRT910CL-Magnified-Tabletop-Rectangular/dp/B00N1WE3UC?th=1, Jun. 2015, in 8 pages.
Kore, "Building an intelligent voice controlled mirror," retrieved from the internet on Jul. 11, 2019: https://medium.com/@akshaykore/building-an-intelligent-voice-controlled-mirror-2edbc7d62c9e, Jun. 26, 2017, in 10 pages.
Pinterest, Plug-in wall-mount makeup mirror has adjustment handle, https://www.pinterest.com/pin/856035841641838288/?d=t&mt=login, viewed on Feb. 1, 2022, in 3 pages.
Sharper Image, Model JRT718CL Product Specification, Slimline Series LED Lighted Wall Mount Mirror, copyright 2015, https://www.ameraproducts.com/Shard/ProductLitirature/Jerdon/JRT718CL-amera.pdf, in 1 pages.
Sharper Image, Model JRT950NL, Slimline LED Lighted Tabletop 8X Magnification Mirror, https://www.amazon.com/Sharper-Imange-JRT950NL-Slimline-Magnification/dp/B015W76T3M?th=1, Jan. 20, 2016, in 8 pages.
Simple Human Vanity Mirror, available from internet at http://www.bedbathandbeyond.com/store/products/simplehuman-reg-5x-sensor-vanity- mirror/1041483503?categoryId=12028, apparently available Dec. 19, 2013, site visited Dec. 2, 2014.
Simple Human Sensor Mirror, Internet Archive Wayback Machine webpage capture of http://www.tuvie.com/stainless-steel-sensor-mirror-by-simplehuman/, apparently available Jan. 27, 2013, site visited Dec. 2, 2014.
Simplehuman Mini Sensor Mirror, available from internet at http://www.amazon.com/gp/product/B00FZ3MFAA/ref=pd_lpo_sbs_dp_ss_2?pf_rd_p=1944579862&pf_rd_s=lpo-top-stripe-1&pf_rd_t=201&pf_rd_i=B00M8MC5H4&pf_rd_m=ATVPDKIKXODER&pf_rd_

(56) References Cited

OTHER PUBLICATIONS r=0RHFJEABM9QKSWJKK99N#Ask, apparently available Mar. 11, 2014, site visited Jan. 8, 2015.

Simplehuman Sensor Mirror, available from internet at http://www.amazon.com/simplehuman-Sensor-Sensor-Activated-Lighted-Magnification/dp/B00M8MC5H4#customerReviews, apparently available Dec. 31, 2014, site visited Jan. 8, 2015.

Simplehuman Wall Mount Mirror, available from internet at http://www.amazon.com/simplehuman-Wall-Mount-Sensor-Mirror/dp/B00FN92ELG#customerReviews, available at least as early as Jan. 31, 2013, site visited Jan. 8, 2015.

Simplehuman Wide View Sensor Mirror, available from internet at http://www.amazon.com/simplehuman-Wide-View-Sensor-Mirror/dp/B01C2RXD7K, site visited Aug. 9, 2016.

Simplehuman Sensor Mirror Pro Wide-View, available from internet at http://www.simplehuman.com/wide-view-sensor-mirror, site visited Aug. 9, 2016.

Brookstone Shower Mirror, available from internet at http://www.brookstone.com/9-Lighted-Fogless-Shower-Mirror?bkiid =?SubCategory_Bath_Spa_Mirrors_Lighting_Makeup_Mirrors%7CSubCategoryWidget%7C608364p&catId=n/, apparently available Jan. 15, 2013, site visited Dec. 2, 2014.

Jerdon Wall Mounted Mirror, available from internet at http://www.amazon.com/Jerdon-HL1016NL-9-5-Inch-Lighted-Magnification/dp/B00413G9K2/ref=sr_1_26?ie=UTF8&qid=1420579897&sr=8-26&keywords=wall+mounted+mirror#customerReviews, apparently available Feb. 21, 2009, site visited Jan. 8, 2015.

Jerdon Wall Mounted Mirror, available from internet at http://www.amazon.com/Jerdon-JD7C-9-Inch-Lighted-Magnification/dp/B001DKVC08/ref=sr_1_54?ie=UTF8&qid=1420580127&sr=8-54&keywords=wall+mounted+mirror, apparently available Oct. 6, 2010, site visited Jan. 8, 2015.

Zadro Z'fogless Mirror with Light, available from internet at http://www.amazon.com/Zadro-1X-Zfogless-Adjustable-Magnification/dp/B000ARWLIW/ref=sr_1_16?s=beauty&ie=UTF8&qid=1439229012&sr=1-16&keywords=zadro+lighted+fogless+mirror, apparently available Nov. 27, 2006, site visited Aug. 10, 2015.

* cited by examiner

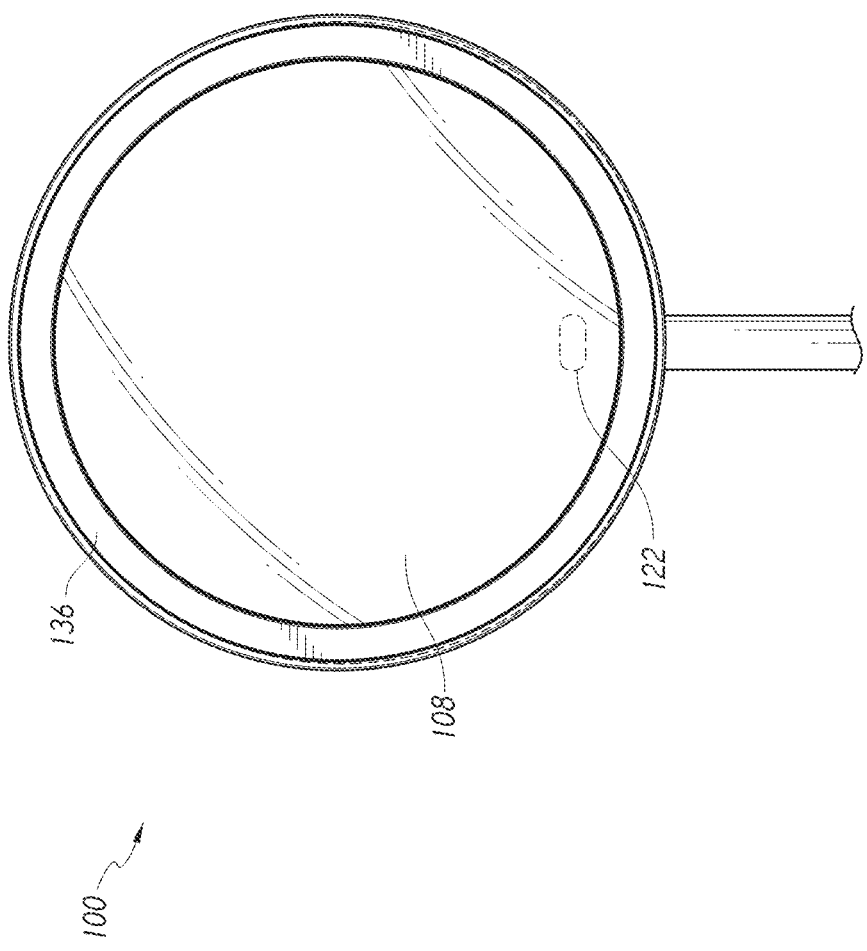

VANITY MIRROR WITH HIDDEN SENSOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims the benefit of U.S. Patent Application No. 63/488,389 titled "VANITY MIRROR WITH HIDDEN SENSOR" and filed Mar. 3, 2023, the entirety of which is hereby incorporated by reference for all purposes and forms a part of this specification.

BACKGROUND

Field

The present disclosure relates to reflective devices such as mirrors, in particular to mirrors having lights that are activated when a user's presence is detected.

Description of the Related Art

Vanity mirrors are mirrors that are typically used for reflecting an image of a user during personal grooming, primping, cosmetic care, or the like. Vanity mirrors are available in different configurations, such as free-standing mirrors, hand-held mirrors, mirrors connected to vanity tables, bathroom wall mirrors, car mirrors, and/or mirrors attached to or produced by electronic screens or devices.

SUMMARY

The following disclosure describes non-limiting examples of some embodiments. For instance, other embodiments according to the present disclosure may or may not include any particular feature or any particular set of features described herein. Moreover, disclosed advantages and benefits may apply only to certain embodiments of the invention and should not be used to limit the disclosure.

In a mirror assembly that includes a proximity sensor for sensing the presence of a user and a controller for activating a user-illuminating light source when a user is sensed, the proximity sensor can be hidden from the user's view upon casual observation by the user. For example, the proximity sensor can be positioned behind or distal from the front, outer, or proximal-most reflective surface of the mirror assembly. The proximity sensor can be positioned on the opposite or back side of the outer or proximal-most reflective surface from the user. In some embodiments, the mirror assembly can hide the proximity sensor from the user by providing a front region of the mirror assembly that reflects a majority of visible light but that permits non-visible light or another form of sensing energy, such as acoustic waves, to pass through this region of the mirror assembly. The sensor positioned behind the front reflective surface can be configured to transmit sensing energy through a region of the mirror assembly toward the user and to receive the reflected energy back from the user, while permitting a majority of visible light that impinges on the front or outer surface of the region to be reflected back to the user.

In some embodiments, a mirror assembly includes a housing, a first mirror, a second mirror, a light source, and a sensor assembly. The housing includes an opening. The first mirror is positioned within the opening of the housing. The first mirror has a front surface and a rear surface. The front surface is visible by a user. The second mirror has a front surface and a rear surface. Each of the first and second mirrors includes a thick substrate or layer of transparent material (e.g., glass or plastic). The front surface of the second mirror is coupled to the rear surface of the first mirror. The light source is disposed on or at least partially around the first mirror. The sensor assembly is positioned between a rear surface of the second mirror and the housing. The sensor assembly includes a transmitter positioned behind the rear surface of the second mirror and a receiver positioned behind the rear surface of the second mirror. The light source is activated when the sensor assembly detects a user's presence.

In some embodiments, the sensor assembly includes a proximity sensor. In some embodiments, the transmitter and the receiver are positioned behind a window of the first mirror. In some embodiments, the mirror assembly includes an indicator or display configured to convey a signal or information to a user through a reflective surface of the mirror assembly, such as an LED light, positioned behind the window of the first mirror. In some embodiments, the LED light can be configured to emit one form of light (e.g., yellow light and/or flashing light) when the mirror assembly is charging, another form of light (e.g., green light and/or flashing light) when the mirror assembly is finished charging, and/or another form of light (e.g., red light and/or flashing light) when the mirror assembly has a low-power or near-depleted battery. In some embodiments, the window is substantially invisible to or hidden from the user upon casual observation in normal use. In some embodiments, the second mirror is smaller than the first mirror. In some embodiments, the first mirror and the second mirror have the same curvature.

In some embodiments, the second mirror is coupled to the rear surface of the first mirror via an optical adhesive. In some embodiments, the optical adhesive is made of a material that mimics, or has substantially the same, index of refraction as the transparent material of the first mirror. In some embodiments, the first mirror has a layer or coating on the rear surface of the transparent material, and the second mirror has a layer or coating on the front surface of the transparent material. In some embodiments, the coating or layer of the first mirror comprises a reflective metal such as aluminum, and the layer or coating of the second mirror comprises a multilayer optical interference coating that includes a plurality of layers comprising two or more of layers comprising metal oxides and/or dielectrics.

In some embodiments, the mirror assembly includes a power source positioned within the housing. In some embodiments, the mirror assembly includes a shaft coupled at a first end to the housing and at a second end to a stand. In some embodiments, the shaft is rotatably coupled at the first end to the housing and the shaft is rotatably coupled at the second end to the stand.

In some embodiments, a mirror assembly includes first mirror, a second mirror, and a sensor assembly. The first mirror has a front surface and a rear surface. The front surface is visible by a user. The second mirror has a front surface and a rear surface. The front surface of the second mirror is coupled to the rear surface of the first mirror. The sensor assembly is positioned behind a rear surface of the second mirror. The sensor assembly includes a transmitter configured to emit light and a receiver configured to receive light. The sensor assembly is configured to detect a user's presence.

In some embodiments, the sensor assembly includes a proximity sensor. In some embodiments, the mirror assembly includes a light source, wherein when a user's presence is detected the light source is activated. In some embodiments, the transmitter and the receiver are positioned behind a window of the first mirror. In some embodiments, the second mirror is smaller than the first mirror. In some embodiments, the first mirror and the second mirror have the same curvature. In some embodiments, the second mirror is coupled to the rear surface of the first mirror via an adhesive. In some embodiments, the first mirror has a coating on the rear surface and the second mirror has a coating on the front surface. In some embodiments, the coating of the first mirror is aluminum and the coating of the second mirror is an optical interference coating.

BRIEF DESCRIPTION OF THE DRAWINGS

Some of these drawings are schematic, showing some examples of basic parts and concepts. Many different or additional structures, implementations, components, mechanisms, steps, and processes can be used. The claimed inventions should not be limited in any way to anything illustrated in the drawings.

FIG. 13 illustrates a front view of the mirror assembly of FIG. 1;

DETAILED DESCRIPTION

Figure 1:
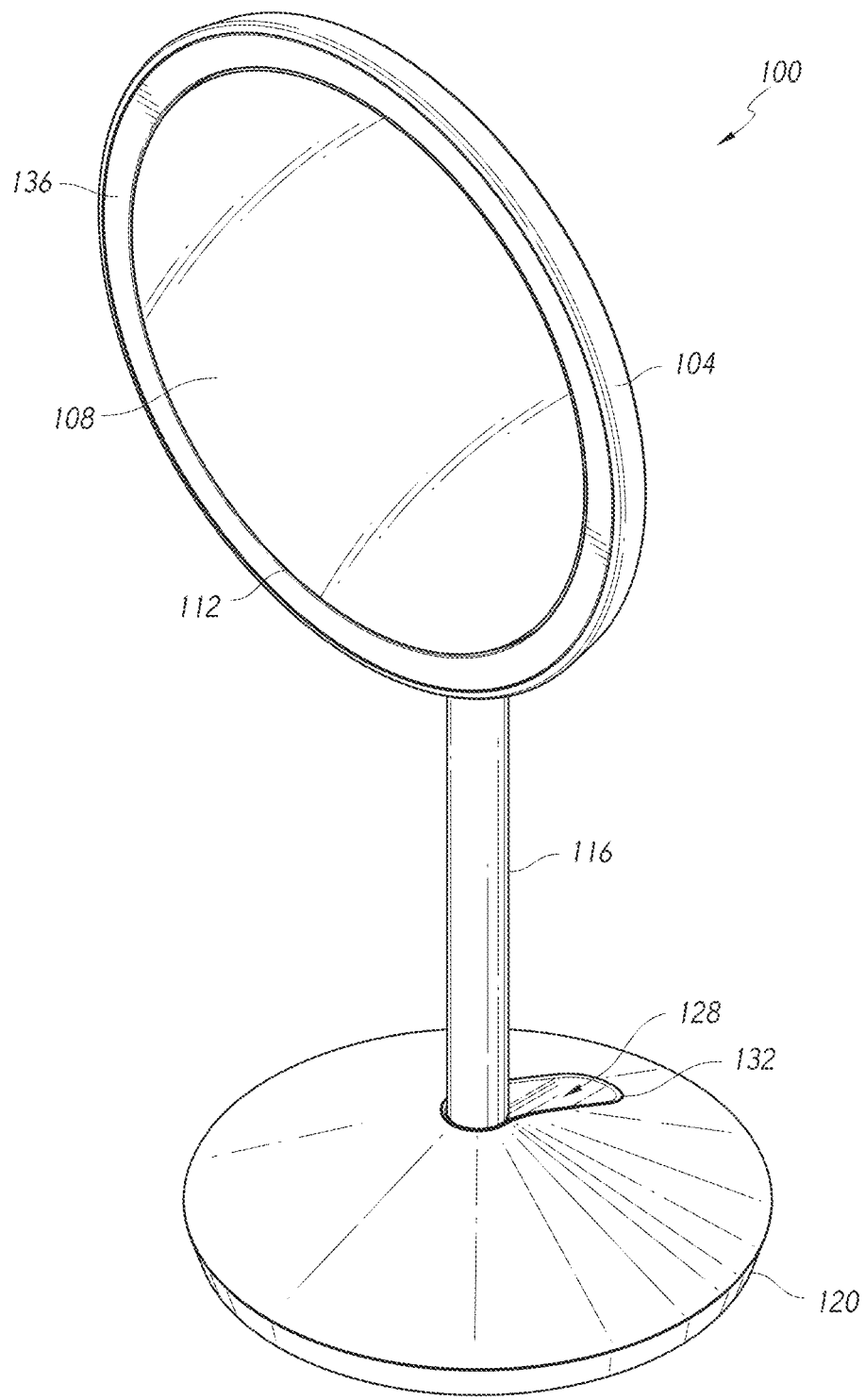
FIG. 1 illustrates a front perspective view of an embodiment of a mirror assembly.
Figure 3:
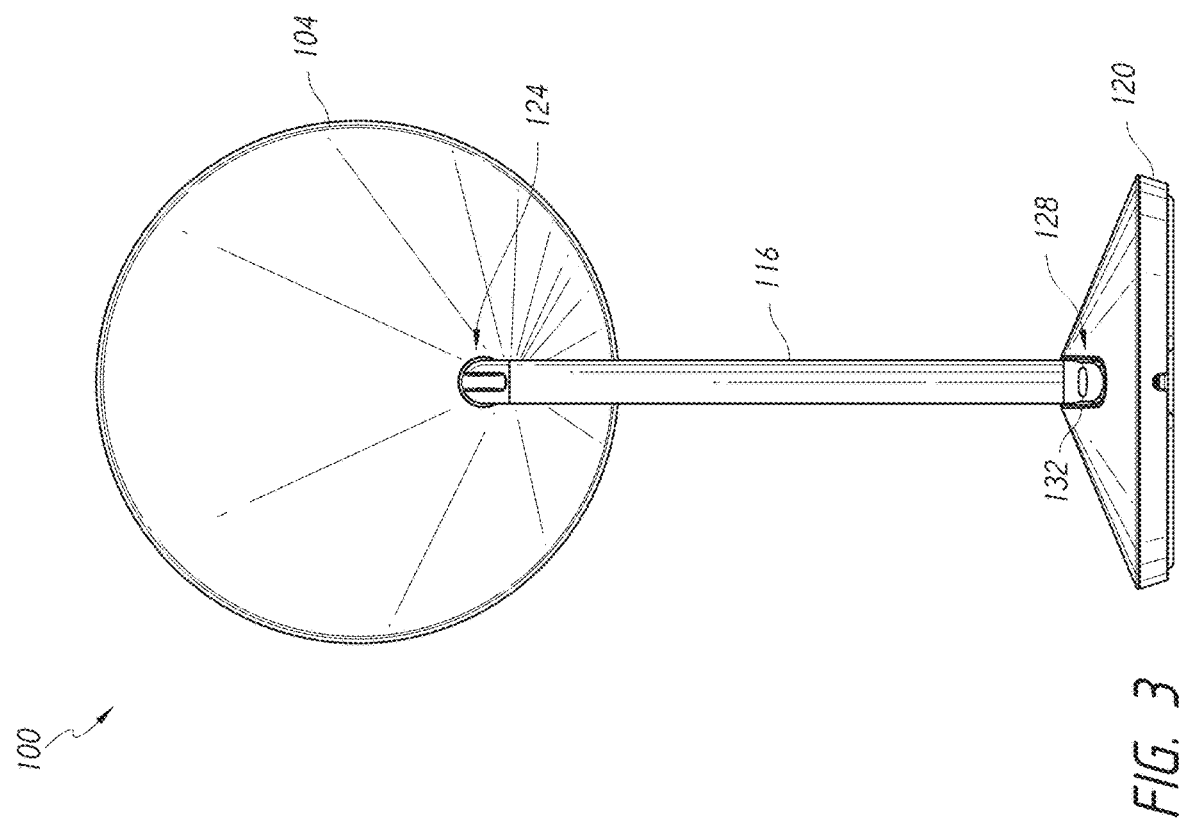
FIG. 3 illustrates a rear view of the mirror assembly of FIG. 1.
Figure 2:
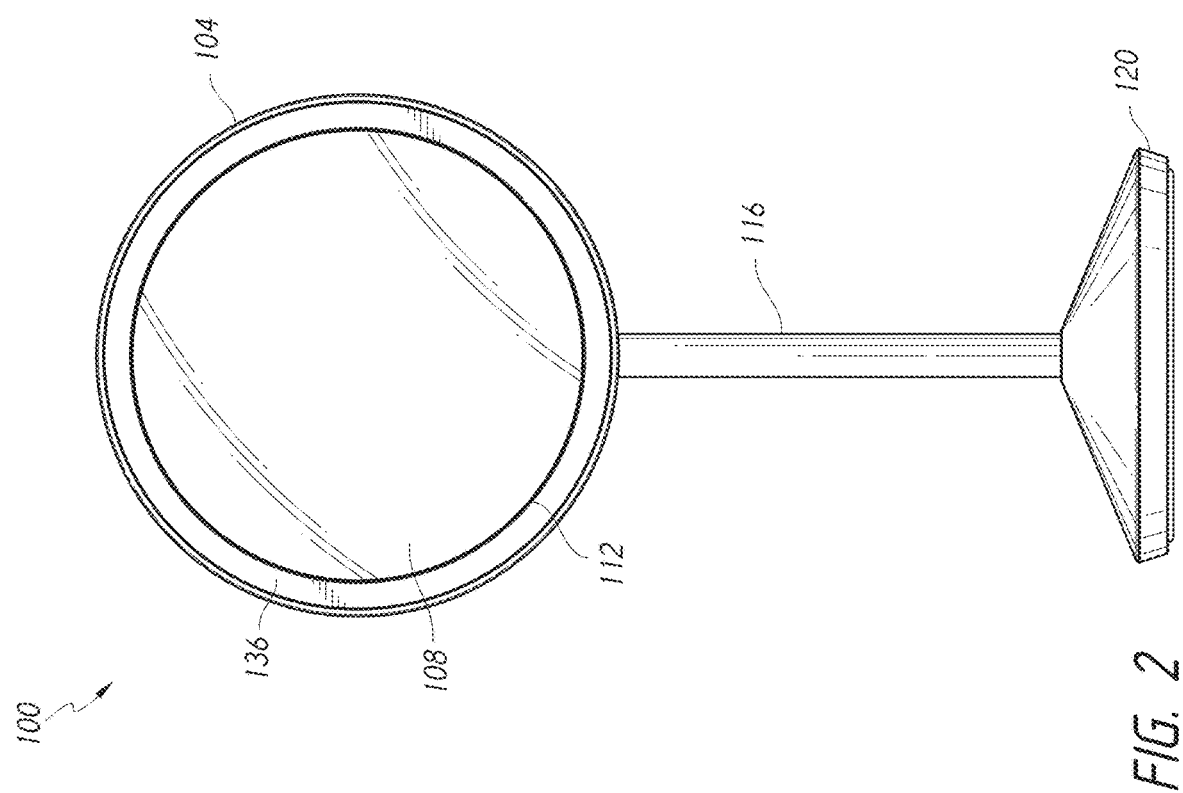
FIG. 2 illustrates a front view of the mirror assembly of FIG. 1.
Figure 5:
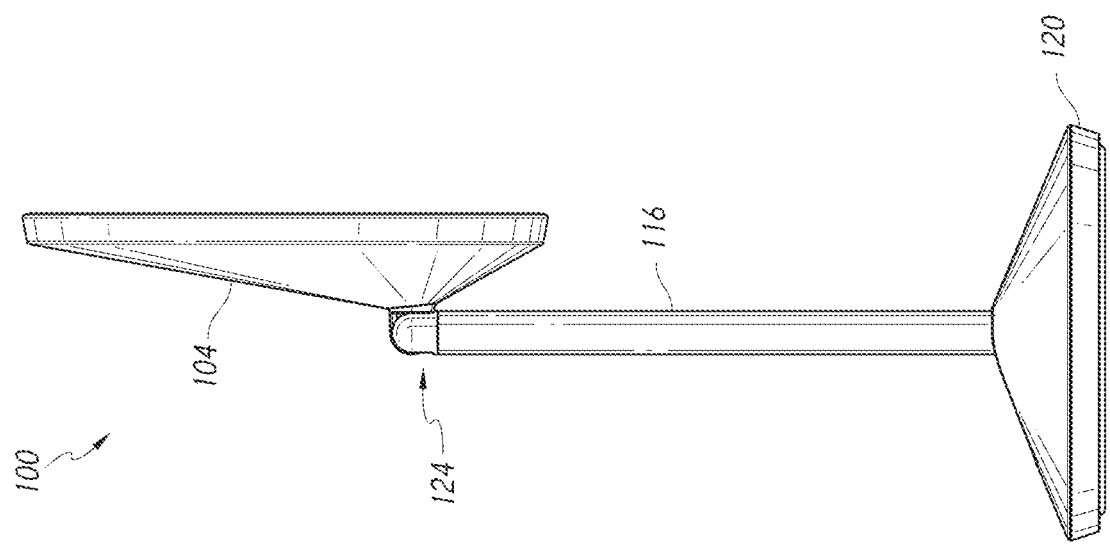
FIG. 5 illustrates a left side view of the mirror assembly of FIG. 1.
Figure 4:
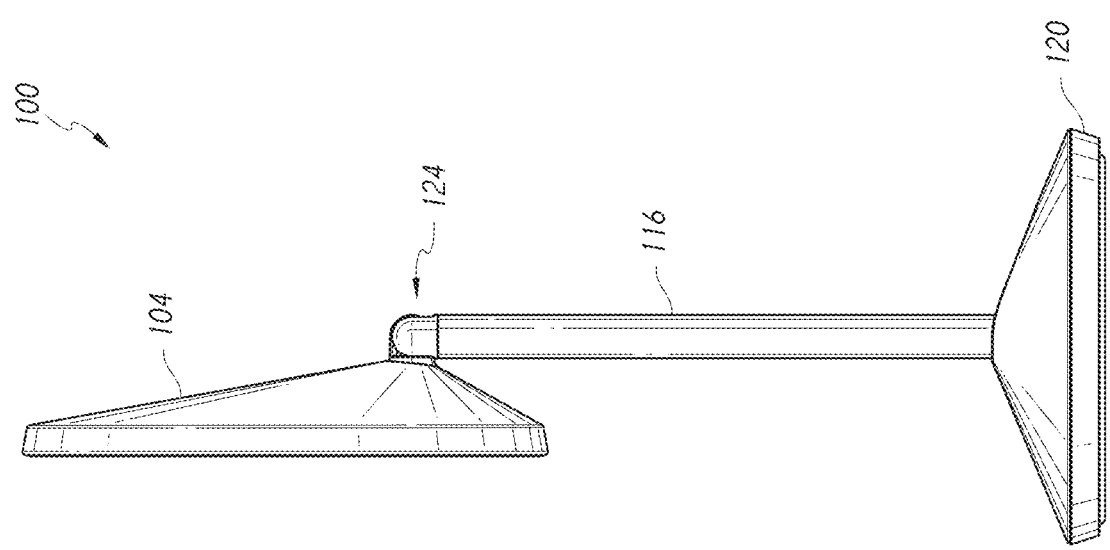
FIG. 4 illustrates a right side view of the mirror assembly of FIG. 1.
Figure 7:
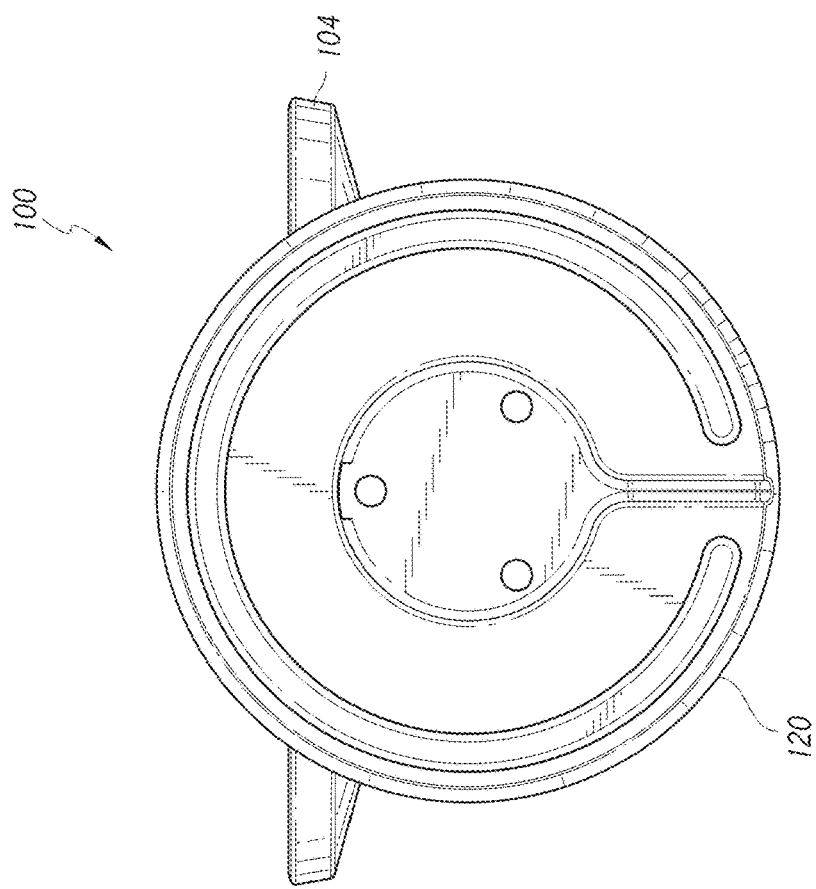
FIG. 7 illustrates a bottom view of the mirror assembly of FIG. 1.
Figure 6:
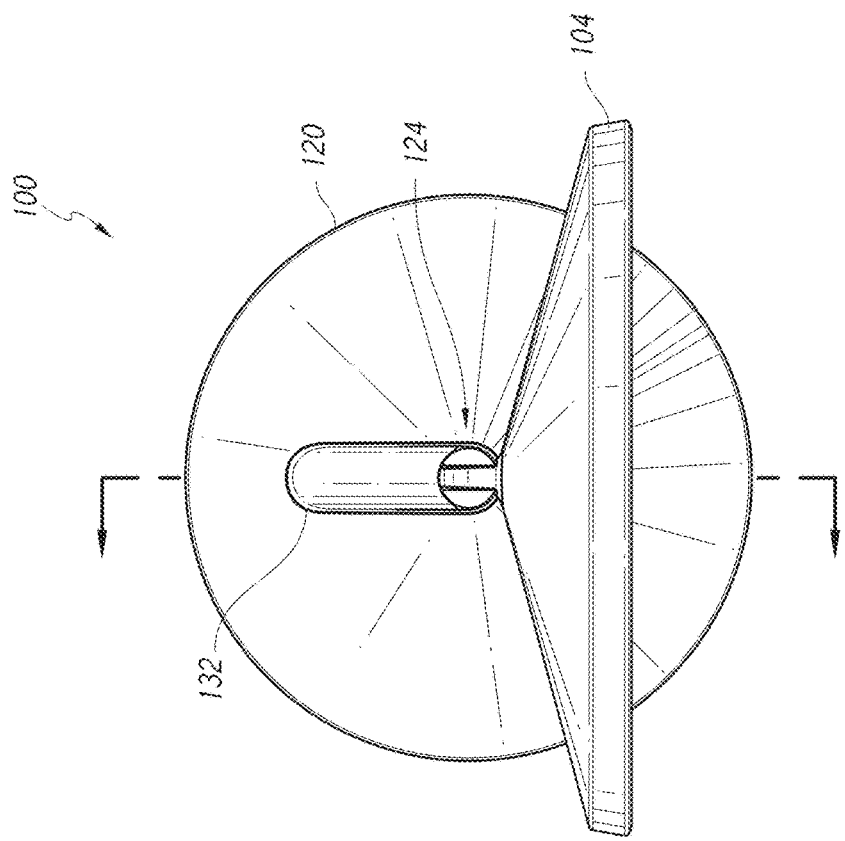
FIG. 6 illustrates a top view of the mirror assembly of FIG. 1.
Figure 8:
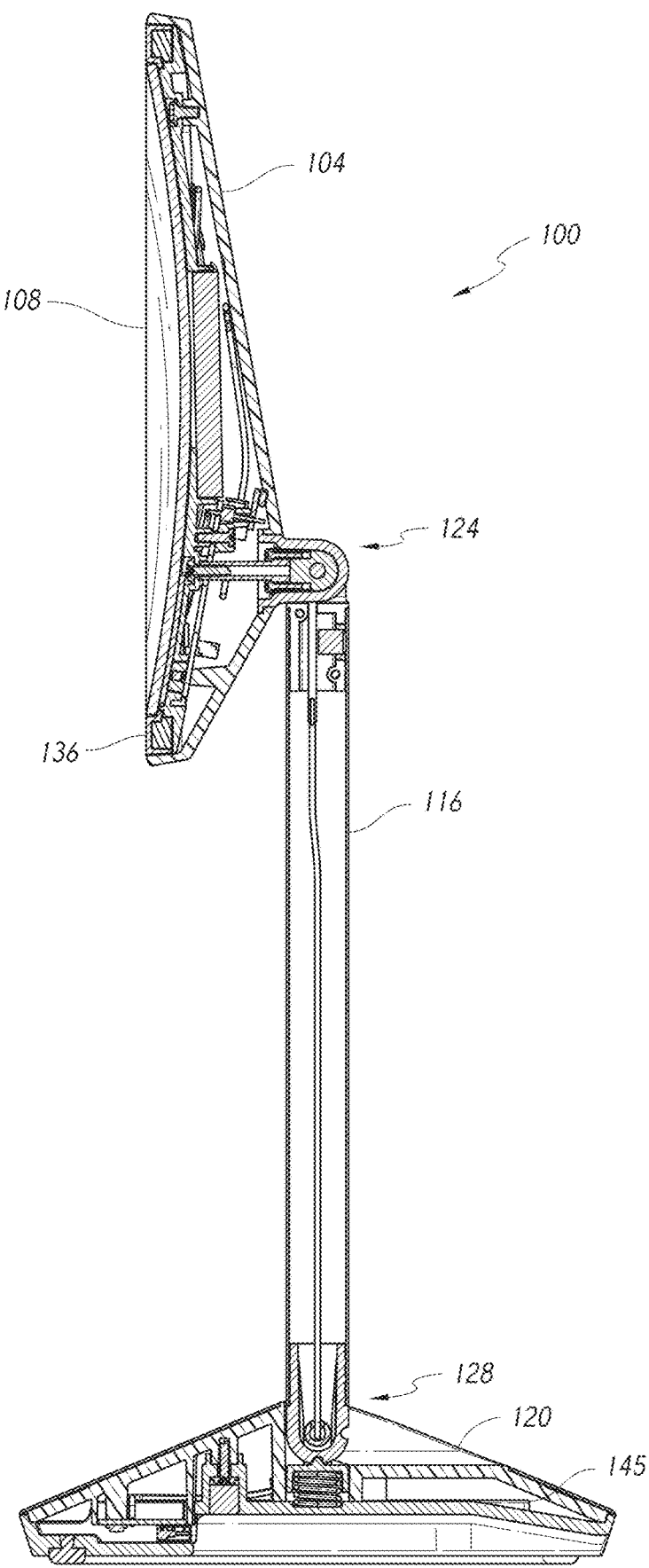
FIG. 8 illustrates a side cross-sectional view of the mirror assembly of FIG. 1.

This specification provides textual descriptions and illustrations of many devices, components, assemblies, and subassemblies. Any structure, material, function, method, or step that is described and/or illustrated in one example can be used by itself or with or instead of any structure, material, function, method, or step that is described and/or illustrated in another example or used in this field. The text and drawings merely provide examples and should not be interpreted as limiting or exclusive. No feature disclosed in this application is considered critical or indispensable. The relative sizes and proportions of the components illustrated in the drawings form part of the supporting disclosure of this specification but should not be considered to limit any claim unless recited in such claim.

Certain embodiments of a mirror assembly are disclosed in the context of a portable, free-standing vanity mirror, as it has particular utility in this context. However, the various aspects of the present disclosure can be used in many other contexts as well, such as wall-mounted mirrors, mirrors mounted on articles of furniture, automobile vanity mirrors (e.g., mirrors located in sun-visors), and otherwise. None of the features described herein are essentially or indispensable. Any feature, structure, or step disclosed herein can be replaced with or combined with any other feature, structure, or step disclosed herein, or omitted.

Embodiments of the present disclosure relate to mirror assemblies. In particular, many embodiments of this disclosure relate to mirror assemblies having one or more light sources that are activated when a user's presence is detected. Some embodiments include one or more proximity sensors that are positioned behind a visual image reflective surface, such as a mirror. The positioning of the sensor(s) behind the mirror can provide an improved visual appearance of the mirror assembly because the sensor is hidden behind the mirror rather than visible on a user facing surface of the mirror assembly. In some implementations, this can provide the benefit of a simpler, more aesthetically pleasing appearance, and the benefit of permitting more light to be emitted more uniformly around the complete perimeter or circumference of the mirror, since the sensor does not occupy a portion of the light-emitting ring or periphery.

FIGS. 1-8 illustrate an example embodiment of a mirror assembly 100. The mirror assembly 100 can include a housing 104 and a visual image reflective surface, such as a mirror 108. The mirror 108 can be positioned within an opening 112 of the housing 104. In some embodiments, the mirror assembly 100 can include a shaft 116 that can couple the housing 104 to a stand 120 or base portion. The shaft 116 and/or the stand 120 can support the housing 104. The housing 104 can comprise plastic, stainless steel, aluminum, or other suitable materials.

In some embodiments the housing 104 can be pivotably coupled to a first end of the shaft 116 at a pivot 124. The pivot 124 can allow the housing portion 104 and mirror 108 to be pivoted in one or more directions (e.g., up, down, right, left, and/or in any other direction). For example, the pivot 124 can include a ball joint, one or more hinges, or otherwise.

Figure 9:
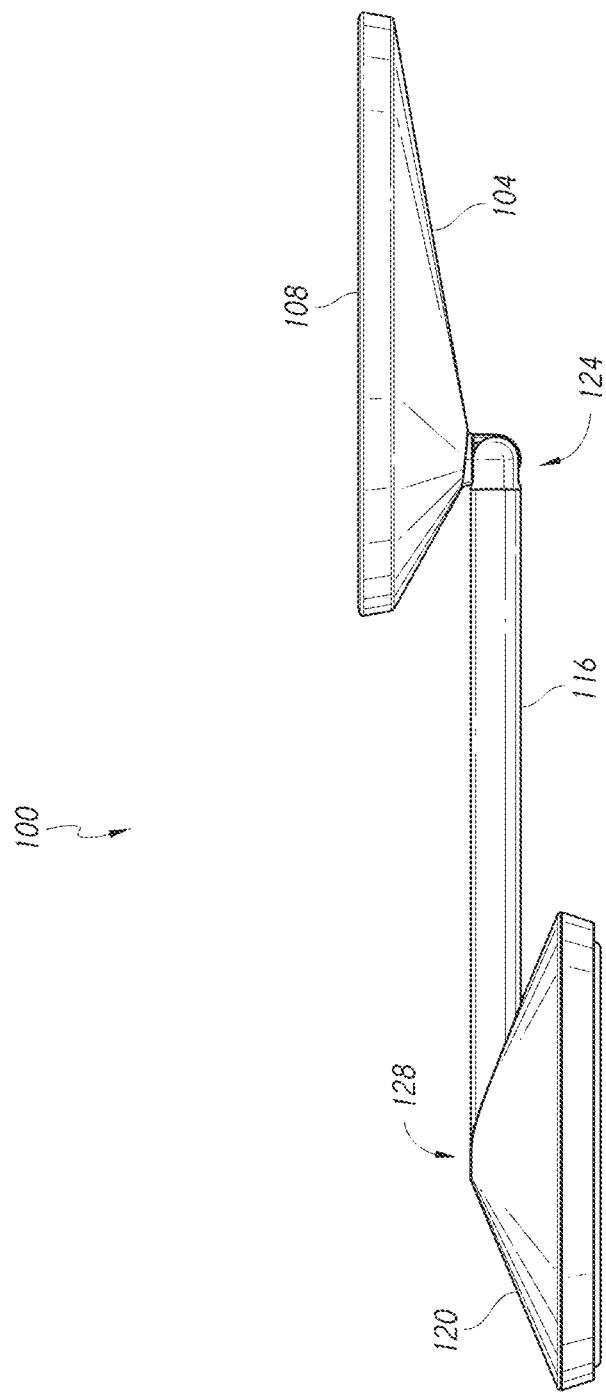
FIG. 9 illustrates a sideview of the mirror assembly of FIG. 1 in a stowed configuration.
Figure 10:
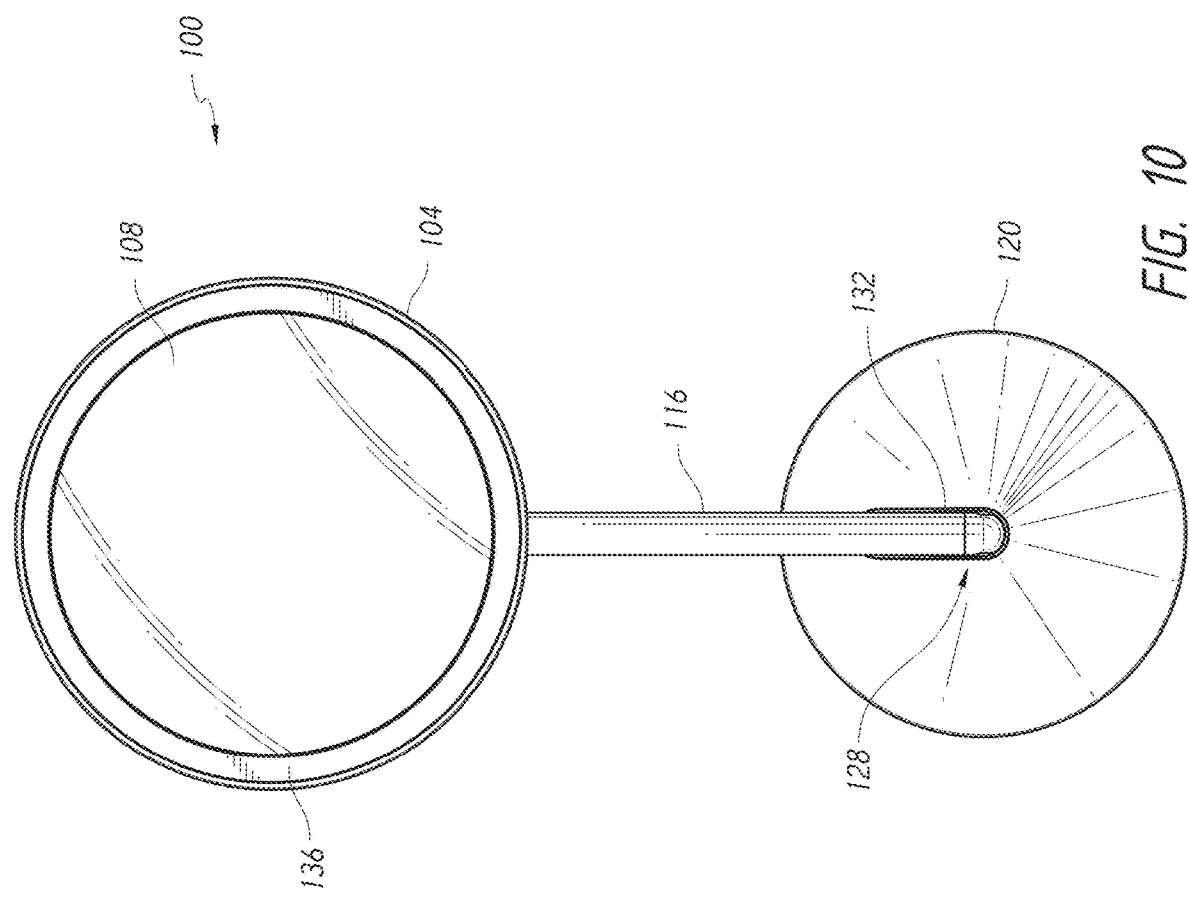
FIG. 10 illustrates a top view of the mirror assembly of FIG. 1 in a stowed configuration.

In some embodiments, the shaft 116 can be pivotably coupled to the stand 120 at a second end of the shaft 116 at a pivot 128. The pivot 128 can allow the shaft 116 to be pivoted in one or more directions (e.g., up, down, right, left, and/or in any other direction). The shaft 116 can be pivoted to transition the mirror assembly 100 to a stowed position as shown in FIGS. 9 and 10. The shaft 116 can be pivoted to rest in a recess 132 of the stand 120.

The mirror 108 can include a generally flat, curved, or generally spherical surface, which can be convex or concave. The radius of curvature can depend on the desired optical power. In some embodiments, the radius of curvature can be at least about 15 inches and/or less than or equal to about 30 inches. The focal length can be half of the radius of curvature. For example, the focal length can be at least about 7.5 inches and/or less than or equal to about 15 inches. In some embodiments, the radius of curvature can be at least about 18 inches and/or less than or equal to about 24 inches. In some embodiments, the mirror 108 can include a radius of curvature of about 20 inches and a focal length of about 10 inches. In some embodiments, the mirror 108 is aspherical, which can facilitate customization of the focal points.

In some embodiments, the radius of curvature of the mirror 108 is controlled such that the magnification (optical power) of the object is at least about 2 times larger and/or less than or equal to about 7 times larger. In certain embodiments, the magnification of the object is about 5 times larger. In some embodiments, the mirror can have a radius of curvature of about 19 inches and/or about 7 times magnification. In some embodiments, the mirror can have a radius of curvature of about 24 inches and/or about 5 times magnification.

As shown, the portion of the mirror assembly 100 that faces the user is the mirror 108, which can have a generally circular shape. In some embodiments, the mirror 108 can have an overall shape that is generally elliptical, generally square, generally rectangular, or any other shape. In some embodiments, the mirror 108 can have a diameter of at least about 8 inches and/or less than or equal to about 12 inches. In some embodiments, the mirror 108 can have a diameter of about 8 inches. In certain embodiments, the mirror 108 can have a diameter of at least about 12 inches and/or less than or equal to about 16 inches. In some embodiments, the mirror 108 can include a thickness of at least about 2 mm and/or less than or equal to about 3 mm. In some embodiments, the thickness is less than or equal to about two millimeters and/or greater than or equal to about three millimeters, depending on the desired properties of the mirror 108 (e.g., reduced weight or greater strength).

The mirror 108 can be highly reflective (e.g., has at least about 90% reflectivity). In some embodiments, the mirror 108 has greater than about 70% reflectivity and/or less than or equal to about 90% reflectivity. In other embodiments, the mirror 108 has at least about 80% reflectivity and/or less than or equal to about 100% reflectivity. In certain embodiments, the mirror 108 has about 87% reflectivity. The mirror 108 can be cut out or ground off from a larger mirror blank so that mirror edge distortions are diminished or eliminated. One or more filters can be provided on the mirror to adjust one or more parameters of the reflected light. In some embodiments, the filter comprises a film and/or a coating that absorbs or enhances the reflection of certain bandwidths of electromagnetic energy. In some embodiments, one or more color adjusting filters, such as a Makrolon filter, can be applied to the mirror to attenuate desired wavelengths of light in the visible spectrum.

The mirror 108 can be optical grade and/or comprise glass. For example, the mirror 108 can include ultra clear glass. Alternatively, the mirror 108 can include other transparent or translucent materials, such as crystal, plastic, nylon, acrylic, or other suitable materials. The mirror 108 can also include a coating or backing 110 that has high reflectivity and low transmissivity, such as a coating or backing 110 that includes a metal such as aluminum or silver. The coating 110 can be on a rear surface of the mirror 108 (e.g., the surface facing away from a user). In some embodiments, the coating 110 can impart a slightly colored tone, such as a slightly bluish tone to the mirror. In some embodiments, an aluminum coating can prevent rust formation and provide an even color tone. The mirror 108 can be manufactured using molding, machining, grinding, polishing, or other techniques.

The mirror assembly 100 can include one or more light sources 136 configured to transmit light. In some embodiments, the light source 136 can surround an outer perimeter of the mirror 108, for example, the light source 136 can be a ring as shown. Light can be evenly or generally uniformly distributed around the entire perimeter of the mirror 108 without any optically significant breaks or interruptions in the light emitting perimeter (such as may otherwise occur if a proximity sensor is positioned along or near the perimeter of the mirror assembly 100). In some embodiments, one or more light sources 136 can be positioned on or around a user facing side of the mirror assembly 100. In some embodiments, one or more light sources 136 can be positioned on a side of the housing 104. Various light sources 136 can be used. For example, the light sources 30 can include light emitting diodes (LEDs), fluorescent light sources, incandescent light sources, halogen light sources, or otherwise.

Figure 12:
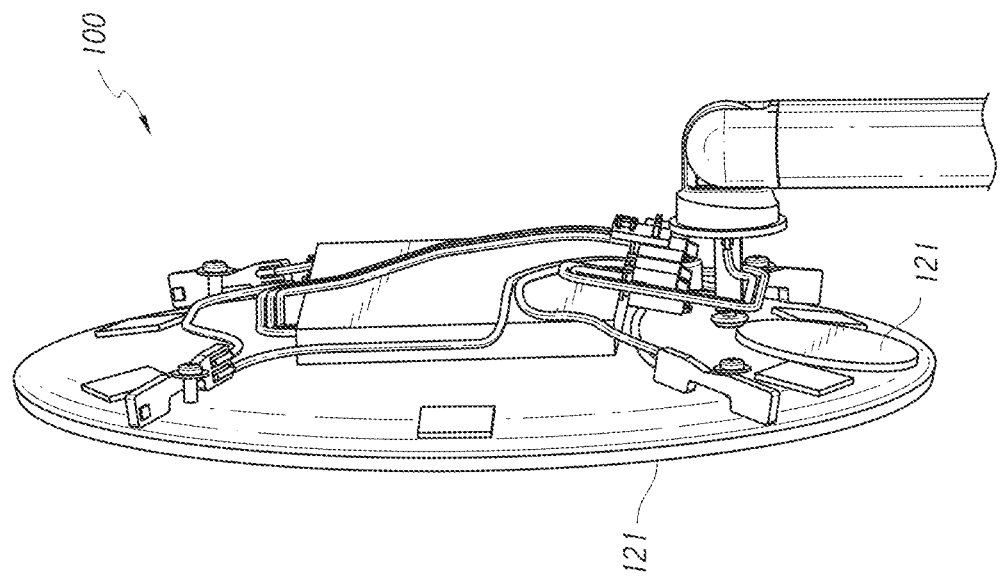
FIG. 12 illustrates a side perspective view of the mirror assembly of FIG. 1 with a housing removed for illustrative purposes.
Figure 11:
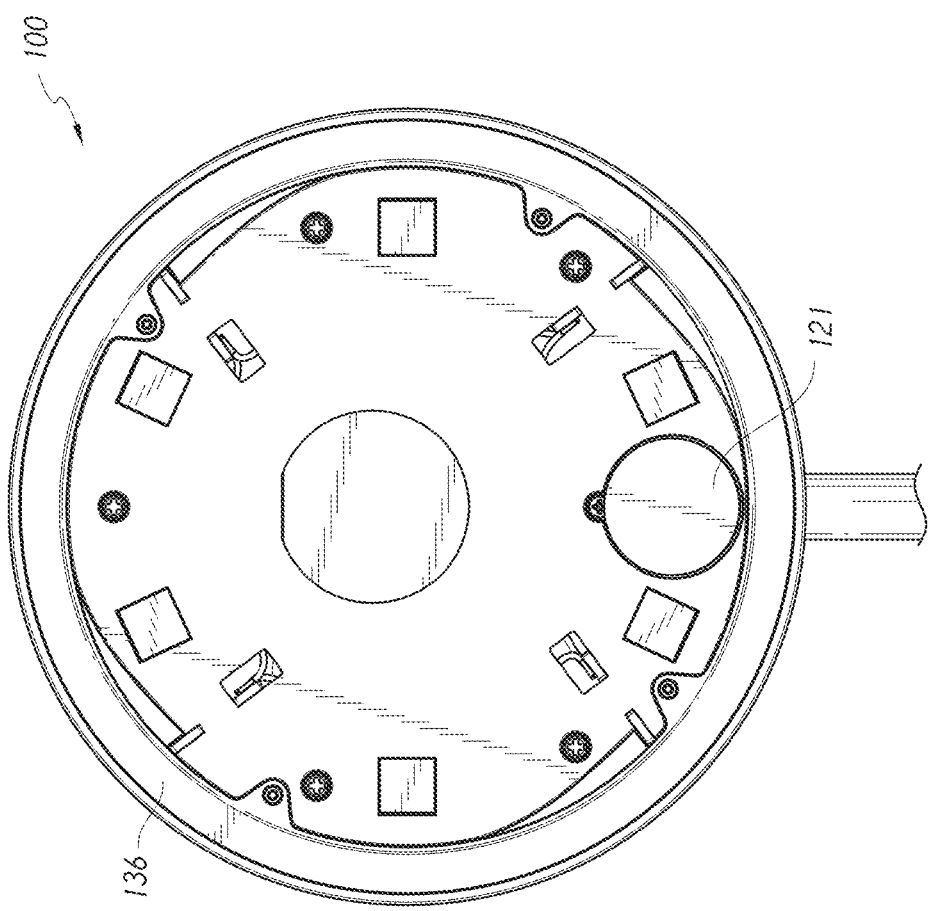
FIG. 11 illustrates a front view of the mirror assembly of FIG. 1 with a first mirror removed for illustrative purposes.

FIG. 11 illustrates the mirror assembly 100 with the first mirror 108 removed for illustrative purposes. FIG. 12 illustrates the mirror assembly 100 with the housing 104 removed for illustrative purposes. As shown in FIGS. 11 and 12, a second mirror 121 can be positioned behind and/or coupled directly or indirectly to the first mirror 108. In some embodiments, the first mirror 108 and the second mirror 121 can both be curved or non-planar as shown, such as with corresponding curvatures that permit the first mirror 108 and second mirrors 121 to fit closely together without any functionally significant gap between them. A rear surface of the first mirror 108 can be coupled with a front surface of the second mirror 121. In some embodiments, the first mirror 108 and the second mirror 121 can be placed adjacent to each other or in contact with each other when the mirror assembly 100 is assembled, such as with a mechanical clip or bracket, or with optical adhesive 114. In some embodiments, the optical adhesive 114 can be made of a material that has the same or substantially the same index of refraction as the transparent material 109 of the first mirror 108 so as to resist refraction of light at the boundary between the transparent material 109 and the optical adhesive 114. The optical adhesive 114 can be used to couple a front surface 111 of the second mirror 121 to a rear surface 110 of the first mirror 108 and/or to fill any gap or avoid that may otherwise occur between or near them.

In some embodiments, the second mirror 121 can be smaller than the first mirror 108. In some embodiments, the first mirror 108 and the second mirror 121 can be the same shape but of different sizes, for example, the first mirror 108 can be a larger circular shape and the second mirror 121 can be a smaller circular shape. While circular mirrors 108, 121 are depicted, any shape mirrors can be used, for example, square, oval, and rectangular. The first mirror 108 and the second mirror 121 can have essentially the same reflectance. The first mirror 108 can have very low transmissivity (e.g., less than or equal to about 15%) to visible light and infrared light, and/or it can have essentially no observable transmissivity by a user to visible light, while the second mirror 121 can have a high transmissivity to infrared light (e.g., at least about 75% transmissivity for infrared light) and it can have very low transmissivity to visible light (e.g., at least about 80% reflectivity). The transmissivity and reflectivity of the first mirror 108 and the second mirror 121 can be similar to each other (e.g., within about 15%) for visible light but substantially different from each other for infrared right (e.g., differing by at least about 50%).

In some embodiments, the second mirror 121 can be positioned behind a window 122 of the first mirror 108, for example, as shown in FIG. 13. The window 122 does not extend through a thickness of the first mirror 108. The window 122 can be a portion of the first mirror 108 that does not have the coating 110 or backing covering it. The window 122 can permit light to be transmitted through the transparent material 109 of the mirror 108 in the region of the window 122). The window 122 can be highly transmissive (e.g., essentially transparent). When positioned in the complete mirror assembly 100, the window 122 and the components behind it can be almost invisible to a user during use, thus hiding the appearance of a sensor assembly, discussed in more detail below.

The second mirror 121 can have a layer, backing, or coating 111 on a front surface of a transparent material 113. The coating 111 can be the surface coupled to the coating 110 of the first mirror 108. The coating 111 can comprise a series or stack of different and/or alternating materials, such as two or more metal oxide, silicon oxide, and/or dielectric layers, to produce a reflective optical interference effect. The color of the coating 111 can be adjusted by choosing suitable materials and/or thicknesses of the materials in the stack to match the color or appearance of the coating 110 on the rear surface of the first mirror 108. Substantially matching the color or appearance of the coating 110 on the rear surface of the first mirror 108 and the coating 111 on the front surface of the second mirror 121 can assist in hiding (e.g., making substantially invisible) the window 122 and the components behind it from the user during use. In some embodiments the mirror 121 can include a transparent material such as glass and one or more layers. In some embodiments, the mirror 121 comprises one or more optical interference coatings or layers such as dielectric glass coatings or layers (e.g., glass with dielectric layers). In some embodiments, the mirror 121 can include an optical interference structure comprising one or more extremely thin layers (e.g., with a thickness that is less than a single wavelength of visible light) that are configured to produce an optical effect such as a predetermined reflectance and/or transmissivity of visible light at particular wavelengths or groupings of wavelengths. For example, in some embodiments, the optical interference structure can comprise a series of layers comprising at least one metallic layer and at least one dielectric layer, such as one or more alternating layers of Titanium dioxide (TiO2) and Silicon Dioxide (SiO2). The one or more alternating layers can be applied by chemical or vapor deposition.

Figure 14:
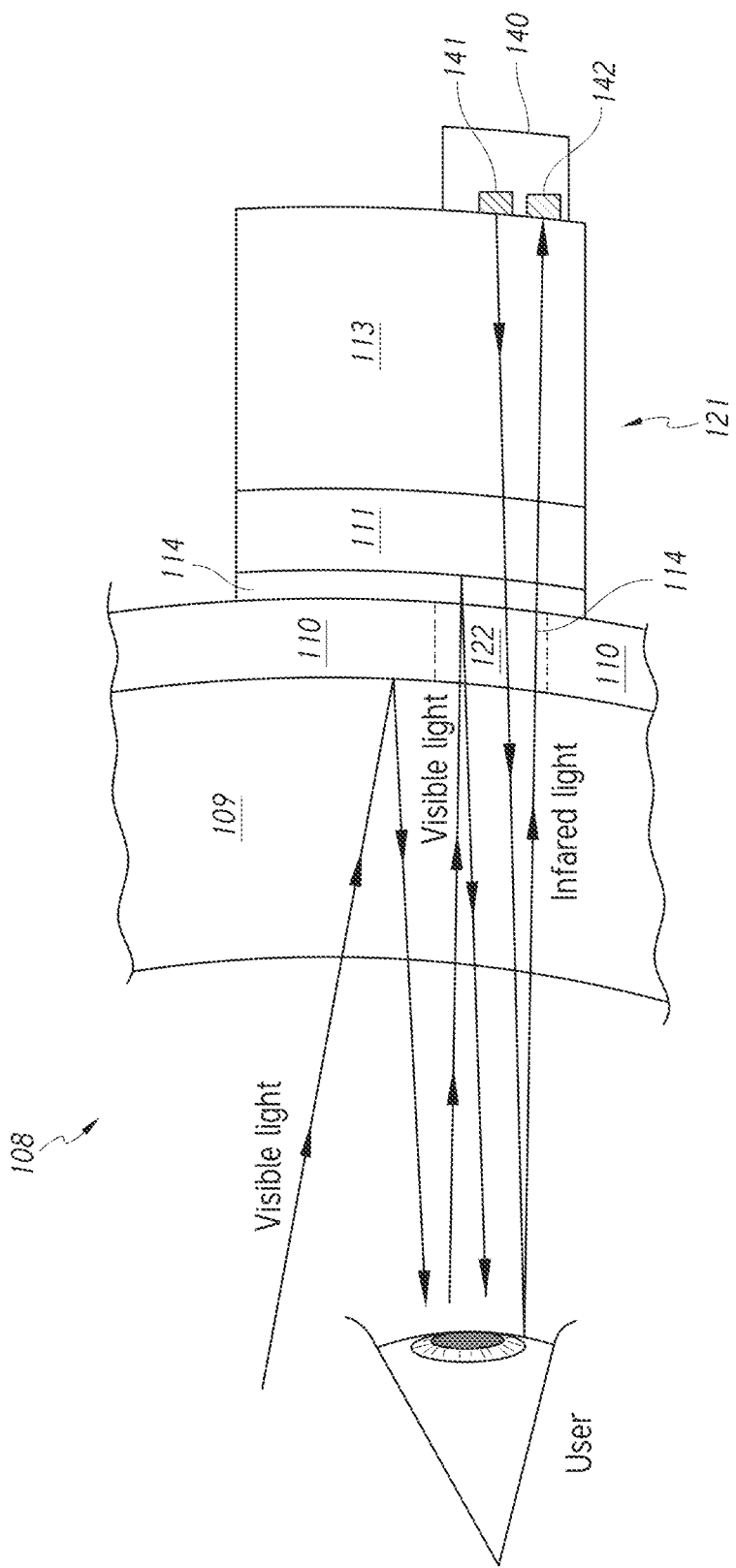
FIG. 14 illustrates a schematic cross-sectional side view of a portion of the layers of the first mirror and the second mirror of the mirror assembly of FIG. 1 when coupled.

When the rear surface of the first mirror 108 is coupled to the front surface of the second mirror 121 the coating 110 on the rear surface of the first mirror 108 and the coating 111 on the front surface of the second mirror 121 can function optically to a user's perception as one coating. For example, as shown in FIG. 14, the assembly 126 of the first mirror 108 and the second mirror 121 can comprise a first glass layer, alternating layers of TiO2 and SiO2, metal (e.g., aluminum), and a second glass layer. The assembly 126 can include a layer of SiO2 on each side of a metal layer. A protective or opaque paint, coating, or layer can be included directly on the glass or on a metal layer and/or can be layered on top of a SiO2 layer or any other layer or structure of the assembly 126. As used in this specification, the term "glass" is used in accordance with its ordinary meaning, which includes a silica-based hard, brittle, transparent material, typically formed in thin layers or panes. With each occurrence of "glass," it is also contemplated that non-glass substances or alternatives that are structured in a manner similar to glass or that perform in substantially the same way as glass can be used, including one or more transparent coated or uncoated polymer sheet materials such as those comprising polycarbonate or acrylic. As with all disclosure in this application, any layer or substrate or combination of layers or substrates that are disclosed in connection with this embodiment can be replaced with or combined with any other layer or substrate or combination of layers or substrates that are disclosed elsewhere herein, or omitted.

In some embodiments, the mirror assembly 100 in one region can have a first layer 109, a second layer 110, a third layer 111, and a fourth layer 113. The material(s) of which each layer 109, 110, 111, 113 are made can comprise glass, metal (e.g., aluminum, silver, titanium dioxide, etc.), and a dielectric material (e.g., SiO2, etc.), and/or any other suitable material. In some embodiments, the mirror 108 can be assembled using a sputtering process, a vaporizing process, a deposition process, and/or any other suitable process. In some embodiments, one or more of the layers can be applied using adhesive, thermal bonding, sonic welding, or in any other suitable way. In some embodiments, the first layer 109 comprises glass. This can help prevent the mirror 108 from becoming scratched because glass is highly scratch resistant, much more scratch resistant than many other materials. In some embodiments, the second layer 110, the layer disposed between the first layer 109 and the third layer 111, comprises a metal (e.g., aluminum). In some embodiments, the third layer 111 comprises a metallic or dielectric material (e.g., TiO2, SiO2). In some embodiments, the fourth layer 113 comprises glass. One or more of the layers 109, 110, 111 can be used in the mirror 121. One or more of the layers 109, 110, 111, 113 can be omitted from the assembly 126, rearranged or assembled in a different order, and/or supplemented by other layers or materials. For example, in some embodiments, a dark coating such as black paint and/or a copper layer is disposed on at least a portion of a metal layer of the mirror 108. Any layer or structure disclosed in this specification is not required to be homogeneous, but can include multiple sub-layers or sub-structures as appropriate.

In some embodiments, an optical interference structure in the mirror 108 can include a combination of layers such as the following:

Example 1

| Layer | Material | Optical Thickness | Physical Thickness (nm) |
|---|---|---|---|
| Substrate | protective paint | | |
| 9 | Al | 0.48 | 120 |
| 8 | SiO2 | 1.0768 | 72.93 |
| 7 | TiO2 | 1.2789 | 53.33 |
| 6 | SiO2 | 1.2948 | 87.7 |
| 5 | TiO2 | 1.3201 | 55.04 |
| 4 | SiO2 | 2.3774 | 161.03 |
| 3 | TiO2 | 1.3064 | 54.47 |
| 2 | SiO2 | 2.1806 | 147.69 |
| 1 | TiO2 | 2.0414 | 85.12 |
| Medium | glass | | |
| Total Thickness | | 13.3564 | 837.31 |

Example 2

| Layer | Material | Optical Thickness | Physical Thickness (nm) |
|---|---|---|---|
| Substrate | protective paint | | |
| 10 | SiO2 | 0.7382 | 50 |
| 9 | Al | 0.48 | 120 |
| 8 | SiO2 | 1.0768 | 72.93 |
| 7 | TiO2 | 1.2789 | 53.33 |
| 6 | SiO2 | 1.2948 | 87.7 |
| 5 | TiO2 | 1.3201 | 55.04 |
| 4 | SiO2 | 2.3774 | 161.03 |
| 3 | TiO2 | 1.3064 | 54.47 |
| 2 | SiO2 | 2.1806 | 147.69 |
| 1 | TiO2 | 2.0414 | 85.12 |
| Medium | glass | | |
| Total Thickness | | 14.0946 | 887.31 |

Of course, many other types and orderings of layers can be used instead of or in addition to those provided in this example. In some embodiments, a reflectance of a mirror with an optical interference structure on a glass substrate can be provided as shown in FIG. 17.

Figure 17:
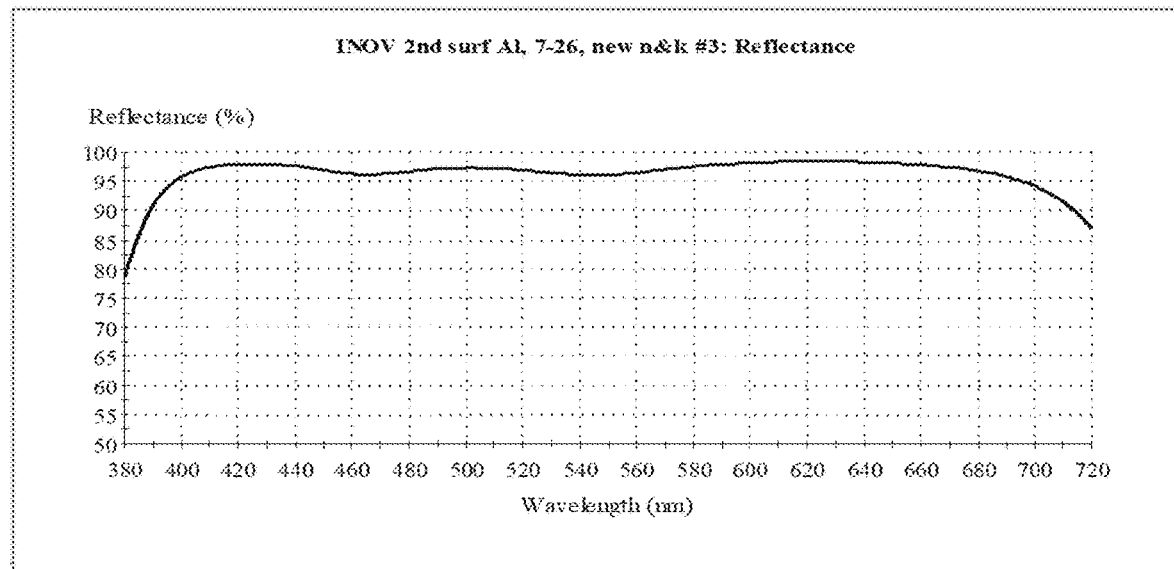
FIG. 17 is a graph showing the relationship between reflectance and wavelength.

For example, as shown in FIG. 17, for a large majority of the wavelengths of visible light, the reflectance can be at least about 95% or at least about 93% or at least about 90%. Of course, any other suitable component or series of components can be configured to provide many other or different values in a useful reflectance profile in accordance with the principles and structures disclosed in this specification.

The relative sizes of the coating layers 110, 111 as illustrated in FIG. 14 is exaggerated as compared to the transparent material 109, 113, for case of illustration. The coating layers 110, 111 can be significantly thinner than as shown as compared to the transparent materials 109, 113.

As shown in FIG. 14, the first mirror 108 can be configured to permit visible light to pass through the front transparent material 109, reflect off of the rear reflective coating or backing 110, pass through the front transparent material 109 again, and then enter the eye of a user, forming a reflected image of the user. The combination of the first mirror 108 and the second mirror 121 can be configured to permit visible light impinging on the region of the first mirror 108 in front of the window 122 to pass through the front transparent material 109, enter the window 122 (which can be filled with optical adhesive 114), pass through the optical adhesive layer 114, reflect off of the front reflective interference coating 111 of the second mirror 121, pass through the optical adhesive layer 114 and the window 122 again, pass through the transparent material 109 again, and then enter the eye of a user, forming a reflected image of the user. The mirror assembly 100 can be configured to effectively hide the window 122 and the components behind it from the user by permitting visible light to be reflected in the region of the window 122 in essentially the same manner and at about the same reflectivity as in the regions of the first mirror 108 that are adjacent to and/or surrounding the window 122.

Simultaneously, the transmitter 141 of the sensor 140 can emit sensing energy, such as electromagnetic energy in the infrared range, through the transparent material 113 of the second mirror 121, through the coating 111, through the optical adhesive, through the window 112, and through the transparent material 109 of the first mirror 109 without substantial refraction, reflection, deviation, attenuation, and/or modification. As shown, the emitted sensing energy can reflect off of the user and then return through the transparent material 109 of the first mirror 108, window 122, optical adhesive 114, coating 111, and transparent material 113 of the second mirror 121, and then proceed into the receiver 142 of the sensor 140, again without substantial refraction, reflection, deviation, attenuation, and/or modification. The sensing energy is not reflected in a significant way by the coating 111 because the interference effects of the coating 111 are calculated to produce reflection for only certain wavelengths of light within the visible range. For example, the coating 111 can be configured to reflect impinging visible light in the same way as the coating 110 of the first mirror 108 so that the reflected visible light in the region of the window 122 is the same as in the other regions of the first mirror 108.

Figure 16:
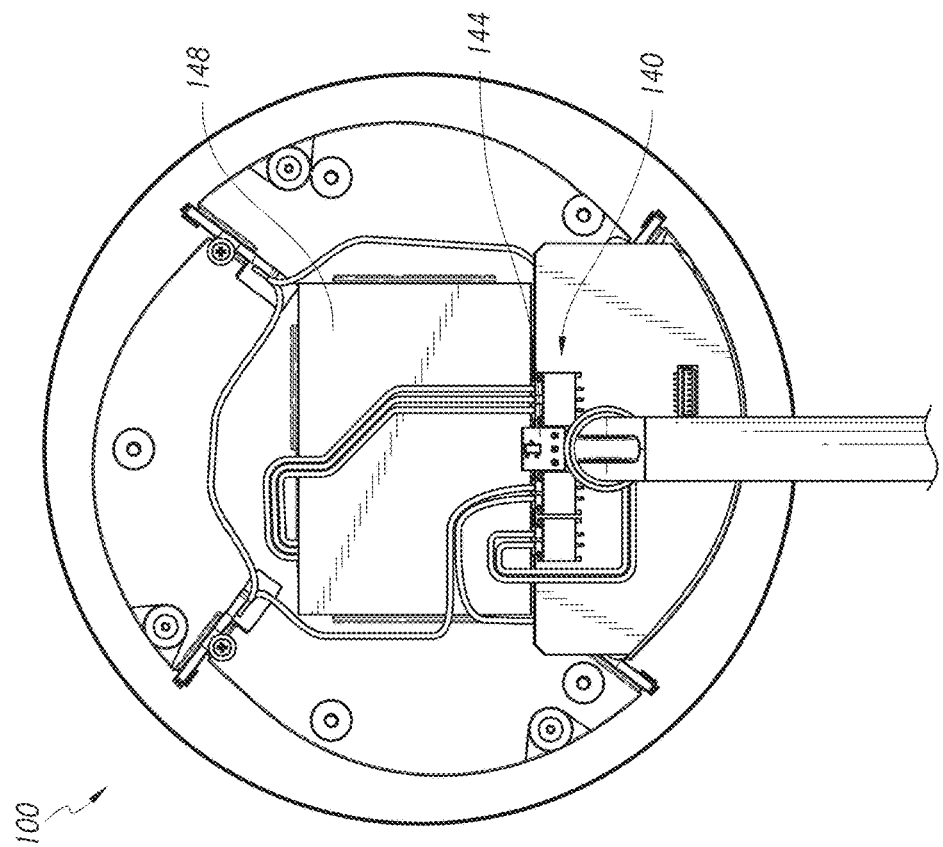
FIG. 16 illustrates a rear view of the mirror assembly of FIG. 1 with a back portion of the housing removed for illustrative purposes.
Figure 15:
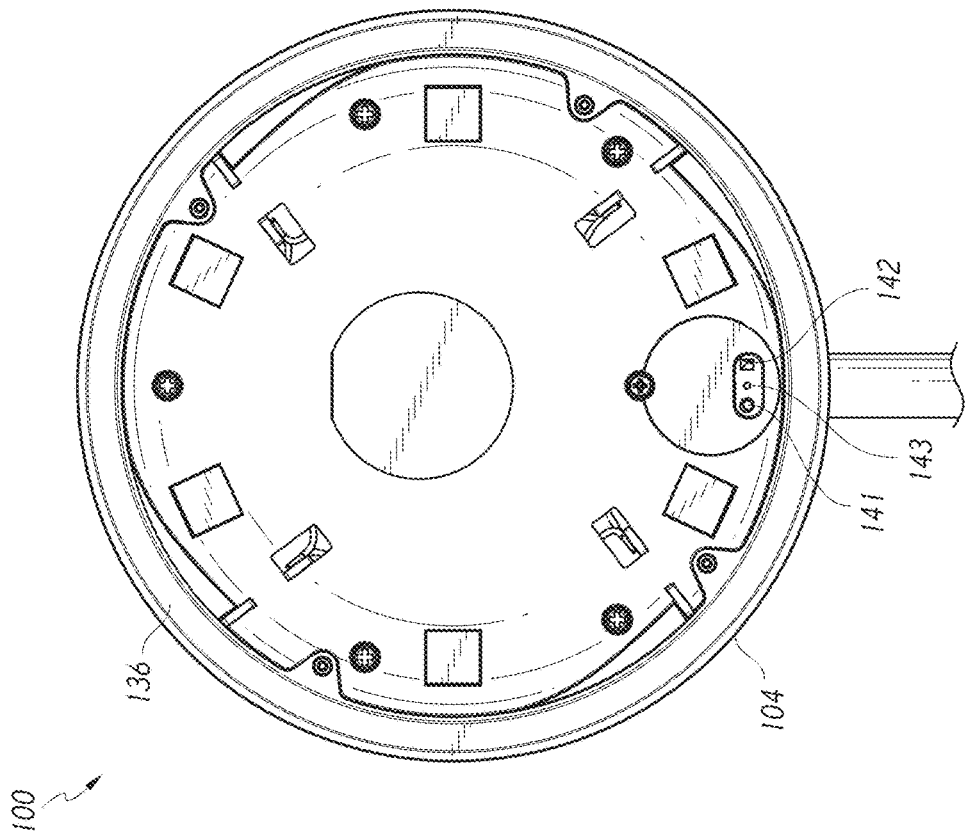
FIG. 15 illustrates a front view of the mirror assembly of FIG. 1 with the first mirror and the second mirror removed for illustrative purposes.

FIG. 15 illustrates a front view of the mirror assembly 100 with the mirror 108 removed for illustrative purposes and FIG. 16 illustrates a rear view of the mirror assembly 100 with a rear portion of the housing 104 removed for illustrative purposes. The mirror assembly 100 can include a sensor assembly 140. The sensor assembly 140 can be positioned between a rear surface of the mirror 108 and a rear surface of the housing 104. The sensor assembly 140 can be enclosed by the mirror 108 and the housing 104. The sensor assembly 140 can be hidden such that it is not visible by a user. In some embodiments, the sensor assembly 140 can be positioned generally central within the housing 104. The sensor assembly 140 can include a sensor 144. In some embodiments, the sensor 144 can be a proximity sensor or a reflective-type sensor. For example, the sensor 144 can be triggered when an object (e.g., a body part) is moved into, and/or produces movement within, a sensing region.

The sensor assembly 140 can include a power source 148 (e.g., a battery, a rechargeable battery, or a cord to be plug into an electrical outlet). The power source 148 can be positioned within the housing 104. The power source 148 can deliver power to the light source 136. In some embodiments, the mirror assembly 100 can include one or more weights 145 (labeled in FIG. 8) disposed in the stand 120 of the mirror assembly 100 to counteract the weight of the sensor assembly 140.

The sensor assembly 140 can include a transmitter 141 and a receiver 142. The transmitter 141 can be an emitting portion (e.g., electromagnetic energy such as infrared light), and the receiver 142 can be a receiving portion (e.g., electromagnetic energy such as infrared light). The beam of light emitting from the transmitter 141 can define a sensing region. In certain variants, the transmitter 141 can emit other types of energy, such as sound waves, radio waves, or any other signals. The transmitter 141 and receiver 142 can be integrated into the same sensor or configured as separate components. The transmitter 141 and the receiver 142 can be positioned behind a rear surface of the second mirror 121. The transmitter 141 and the receiver 142 can be aligned with and/or positioned behind the window 122 of the first mirror 108.

In some embodiments, the mirror assembly 104 can include an LED light 143. The LED light 143 can be positioned behind a rear surface of the second mirror 121. The LED light 143 can be aligned with and/or positioned behind the window 122 of the first mirror 108. The LED light 143 can be configured to emit a light in order to alert a user to a predetermined type of information. In some embodiments, the light can be emitted to indicate in one or more different ways (e.g., changing color, flashing, emitting in a steady state, etc.) that the battery of the mirror assembly 100 is charging, finished charging, and/or nearing depletion. In some embodiments, the light can be emitted to indicate that a user's presence has been identified.

In some embodiments, the sensor assembly 140 can detect an object within a sensing region. In certain embodiments, the sensing region can have a range from at least about 0 degrees to less than or equal to about 45 degrees downward relative to an axis extending from the sensor assembly 28, and/or relative to a line extending generally perpendicular to a front surface of the sensor assembly, and/or relative to a line extending generally perpendicular to the front face of the mirror and generally outwardly toward the user from the top of the mirror assembly. In certain embodiments, the sensing region can have a range from at least about 0 degrees to less than or equal to about 25 degrees downward relative to any of these axes or lines. In certain embodiments, the sensing region can have a range from at least about 0 degrees to less than or equal to about 15 degrees downward relative to any of these axes or lines.

If the receiving portion detects reflected energy (e.g., above a threshold level) from an object within the beam of light emitted from the transmitter 141, the sensor assembly 140 sends a signal to a controller to activate the light source 136. Once the light source 136 activates, the light source 136 can remain activated so long as the sensor assembly 140 detects an object in a sensing region. Alternatively, the light source 136 can remain activated for a pre-determined period of time. For example, activating the light source 136 can initialize a timer. If the sensor assembly 140 does not detect an object before the timer runs out, then the light source 136 is deactivated. If the sensor assembly 140 detects an object before the timer runs out, then the controller can reinitialize the timer, either immediately or after the time runs out.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The ranges disclosed herein also encompass any and all overlap, sub-ranges, and combinations thereof. Language such as "up to," "at least," "greater than," "less than," "between" and the like includes the number recited. Numbers preceded by a term such as "about" or "approximately" include the recited numbers. For example, "about 5 mm" includes "5 mm."

The term "horizontal" as used herein is defined as a plane parallel to the ground or floor on which the component or device is positioned in normal use, either directly or indirectly. The term "vertical" refers to a direction perpendicular to the horizontal as just defined. Terms such as "above," "below," "bottom," "top," "side," "higher," "lower," "upper," "over," and "under," are defined with respect to the horizontal plane.

Although certain embodiments and examples have been described herein, it will be understood by those skilled in the art that many aspects of the devices shown and described in the present disclosure may be differently combined and/or modified to form still further embodiments or acceptable examples. All such modifications and variations are intended to be included herein within the scope of this disclosure. A wide variety of designs and approaches are contemplated. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The following is claimed:

1. A mirror assembly comprising:
a first mirror with a front surface and a rear surface, the front surface visible by a user;
a second mirror having a front surface and a rear surface, the front surface of the second mirror coupled to the rear surface of the first mirror;
a light source disposed on or at least partially around the first mirror; and
a sensor assembly positioned behind a rear surface of the second mirror, the sensor assembly comprising:
a transmitter positioned behind the rear surface of the second mirror; and
a receiver positioned behind the rear surface of the second mirror;
wherein the light source is configured to be activated by the sensor assembly.

2. The mirror assembly of claim 1, wherein the sensor assembly comprises a proximity sensor.

3. The mirror assembly of claim 1, wherein the transmitter and the receiver are positioned behind a window of the first mirror.

4. The mirror assembly of claim 3, further comprising an LED light positioned behind the window of the first mirror, wherein the LED light can be configured to emit a light when the mirror assembly is charging.

5. The mirror assembly of claim 3, wherein the window is substantially invisible to the user.

6. The mirror assembly of claim 1, wherein the second mirror is smaller than the first mirror.

7. The mirror assembly of claim 1, wherein the first mirror and the second mirror have the same curvature.

8. The mirror assembly of claim 1, wherein the second mirror is coupled to the rear surface of the first mirror via an adhesive.

9. The mirror assembly of claim 8, wherein the index of refraction of the adhesive is substantially the same as the index of refraction of a transparent material of the first mirror.

10. The mirror assembly of claim 1, wherein the first mirror has a coating on the rear surface and the second mirror has a coating on the front surface.

11. The mirror assembly of claim 10, wherein the coating of the first mirror is aluminum and the coating of the second mirror is an optical interference coating.

12. The mirror assembly of claim 1, further comprising a power source positioned within a housing of the mirror assembly.

13. The mirror assembly of claim 1, further comprising a shaft coupled at a first end to a housing of the mirror assembly and at a second end to a stand.

14. The mirror assembly of claim 13, wherein the shaft is rotatably coupled at the first end to the housing and the shaft is rotatably coupled at the second end to the stand.

15. A mirror assembly comprising:
a first mirror with a front surface and a rear surface, the front surface visible by a user;
a second mirror having a front surface and a rear surface, the front surface of the second mirror coupled to the rear surface of the first mirror; and
a sensor assembly positioned behind the rear surface of the second mirror, the sensor assembly comprising:
a transmitter configured to emit light; and
a receiver configured to receive light;
wherein the sensor assembly is configured to detect a user's presence.

16. The mirror assembly of claim 15, wherein the sensor assembly comprises a proximity sensor.

17. The mirror assembly of claim 15, further comprising a light source, wherein when a user's presence is detected the light source is activated.

18. The mirror assembly of claim 15, wherein the transmitter and the receiver are positioned behind a window of the first mirror.

19. The mirror assembly of claim 15, wherein the second mirror is smaller than the first mirror.

20. The mirror assembly of claim 15, wherein the first mirror and the second mirror have the same curvature.

21. The mirror assembly of claim 15, wherein the second mirror is coupled to the rear surface of the first mirror via an adhesive.

22. The mirror assembly of claim 15, wherein the first mirror has a coating on the rear surface and the second mirror has a coating on the front surface.

23. The mirror assembly of claim 22, wherein the coating of the first mirror is aluminum and the coating of the second mirror comprises a dielectric layer.

* * * * *